US012669180B2

(12) United States Patent
Brock et al.

(10) Patent No.: US 12,669,180 B2
(45) Date of Patent: Jun. 30, 2026

(54) MULTI-WAY VALVE

(71) Applicant: Stant USA Corp., Connersville, IN (US)

(72) Inventors: Michael S. Brock, Connersville, IN (US); J Bradley Groom, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 295 days.

(21) Appl. No.: 18/600,589

(22) Filed: Mar. 8, 2024

(65) Prior Publication Data

US 2024/0318733 A1    Sep. 26, 2024

Related U.S. Application Data

(60) Provisional application No. 63/454,447, filed on Mar. 24, 2023.

(51) Int. Cl.
| | |
|---|---|
| *F16K 3/10* | (2006.01) |
| *F16K 11/074* | (2006.01) |
| *F16K 11/22* | (2006.01) |
| *F16K 27/04* | (2006.01) |
| *F01P 7/14* | (2006.01) |

(52) U.S. Cl.
CPC ............ *F16K 3/10* (2013.01); *F16K 11/0743* (2013.01); *F16K 11/22* (2013.01); *F16K 27/045* (2013.01); *F01P 2007/146* (2013.01)

(58) Field of Classification Search
CPC ........ F16K 3/10; F16K 11/22; F16K 11/0743; F16K 27/045; F01P 2007/146; F01P 7/14
See application file for complete search history.

(56) References Cited

U.S. PATENT DOCUMENTS

| | | | | | |
|---|---|---|---|---|---|
| 2,202,961 | A | * | 6/1940 | Parker | F16K 3/10 |
| | | | | | 137/881 |
| 2,209,991 | A | * | 8/1940 | McGill | F16K 11/0743 |
| | | | | | 251/159 |
| 2,209,992 | A | * | 8/1940 | McGill | F16K 3/10 |
| | | | | | 137/625.29 |
| 2,209,993 | A | * | 8/1940 | McGill | F16K 11/0743 |
| | | | | | 137/625.29 |
| 2,253,020 | A | * | 8/1941 | Daniels | F16K 3/10 |
| | | | | | 137/625.29 |

(Continued)

FOREIGN PATENT DOCUMENTS

| | | | | | |
|---|---|---|---|---|---|
| CN | | 204610957 U | * | 9/2015 | |
| CN | | 106090315 A | * | 11/2016 | F16K 11/085 |

(Continued)

OTHER PUBLICATIONS

European Search Report for Application No. 24164465.7-1015, dated Aug. 14, 2024, 8 pages.

*Primary Examiner* — David Colon-Morales
(74) *Attorney, Agent, or Firm* — Barnes & Thornburg

(57) ABSTRACT

A multi-way valve adapted to control a flow of fluid to different thermal fluid circuits includes a valve housing, a valve flow controller, and sealing systems. The valve flow controller is arranged in the valve housing to control flow through the valve housing. Each scaling system is configured to seal between the valve housing and one of the valve rotors included in the valve flow controller.

34 Claims, 26 Drawing Sheets

(56) References Cited

U.S. PATENT DOCUMENTS

| | | | |
|---|---|---|---|
| 2,610,511 A * | 9/1952 | Mansen | F16K 11/0743 74/89.45 |
| 2,644,484 A * | 7/1953 | Mansen | F16K 3/10 137/881 |
| 2,777,515 A * | 1/1957 | Stirling | F16K 11/0743 251/162 |
| 3,146,794 A * | 9/1964 | Hollman | F16K 11/0743 137/625.3 |
| 3,251,408 A | 5/1966 | Henry et al. | |
| 3,742,979 A * | 7/1973 | Woodling | F16K 11/074 251/192 |
| 3,927,693 A | 12/1975 | Johnston | |
| 4,216,798 A * | 8/1980 | Tscherner | F16K 11/0743 137/625.46 |
| 4,429,717 A | 2/1984 | Montgomery | |
| 4,674,538 A * | 6/1987 | Yes | F16K 11/0743 137/625.46 |
| 5,307,838 A * | 5/1994 | d'Agostino | F16K 11/074 137/865 |
| 5,377,718 A * | 1/1995 | Sand | F16K 11/0743 137/893 |
| 5,431,189 A | 7/1995 | Jones | |
| 5,529,758 A | 6/1996 | Houston | |
| 5,950,576 A * | 9/1999 | Busato | F01P 7/16 137/625.46 |
| 6,186,174 B1 * | 2/2001 | Yurchision | F16K 3/10 137/625.46 |
| 6,193,213 B1 * | 2/2001 | Stearns | F16K 3/188 137/625.46 |
| 6,245,233 B1 | 6/2001 | Lu | |
| 6,347,644 B1 * | 2/2002 | Channell | F16K 11/20 137/625.29 |
| 6,371,060 B1 * | 4/2002 | Lehmann | F16K 11/074 123/41.1 |
| 7,819,948 B2 * | 10/2010 | Wagner | F16K 11/074 95/100 |
| 8,336,319 B2 | 12/2012 | Johnston et al. | |
| 8,375,990 B2 | 2/2013 | Veros | |
| 8,402,776 B2 | 3/2013 | Johnston et al. | |
| 8,448,696 B2 | 5/2013 | Johnston et al. | |
| 9,347,577 B2 * | 5/2016 | Peterson | F16K 31/0603 |
| 9,777,469 B2 | 10/2017 | Wang | |
| 10,344,877 B2 | 7/2019 | Roche et al. | |
| 10,665,908 B2 | 5/2020 | Krull et al. | |
| 10,851,901 B2 * | 12/2020 | Liberman | F16K 11/165 |
| 10,967,702 B2 | 4/2021 | Mancini et al. | |
| 11,084,404 B2 | 8/2021 | Gupta et al. | |
| 11,168,797 B2 | 11/2021 | Dragojlov et al. | |
| 11,175,265 B2 * | 11/2021 | Stearns | G01N 30/20 |
| 11,247,529 B2 | 2/2022 | Zhou et al. | |
| 11,383,578 B2 | 7/2022 | Huang et al. | |
| 11,572,957 B2 * | 2/2023 | Chapman | F16K 11/0743 |
| 11,585,451 B2 * | 2/2023 | Chapman | F16K 11/0743 |
| 12,110,973 B2 * | 10/2024 | Tiemeyer | F01P 7/165 |
| 12,422,050 B2 * | 9/2025 | Brock | F16K 3/10 |
| 2006/0118066 A1 | 6/2006 | Martins | |
| 2006/0231146 A1 | 10/2006 | Lillback | |
| 2008/0223464 A1 | 9/2008 | Merrell | |
| 2010/0319796 A1 | 12/2010 | Whitaker | |
| 2014/0053931 A1 | 2/2014 | Whitaker | |
| 2014/0090414 A1 | 4/2014 | Mclane et al. | |
| 2015/0354716 A1 | 12/2015 | Morein | |
| 2017/0089474 A1 | 3/2017 | Zhan et al. | |
| 2019/0039440 A1 | 2/2019 | Calderone | |
| 2020/0011437 A1 | 1/2020 | Lin et al. | |
| 2021/0331554 A1 | 10/2021 | Mancini et al. | |
| 2022/0146003 A1 | 5/2022 | Yu et al. | |
| 2022/0390026 A1 | 12/2022 | Chapman | |
| 2024/0183456 A1 * | 6/2024 | Bachofer | F01P 7/16 |
| 2024/0317017 A1 * | 9/2024 | Brock | B60H 1/00571 |

FOREIGN PATENT DOCUMENTS

| | | | | |
|---|---|---|---|---|
| CN | 107893865 A | 4/2018 | | |
| CN | 106090315 B | 8/2018 | | |
| CN | 112682541 A | * 4/2021 | | |
| CN | 214743520 U | 11/2021 | | |
| CN | 214946603 U | 11/2021 | | |
| CN | 214999563 U | 12/2021 | | |
| CN | 215059741 U | * 12/2021 | | |
| CN | 215950468 U | 3/2022 | | |
| CN | 114688306 A | 7/2022 | | |
| CN | 217207877 U | 8/2022 | | |
| CN | 217539713 U | 10/2022 | | |
| CN | 114635991 B | 3/2023 | | |
| CN | 220102162 A | 11/2023 | | |
| CN | 220102162 U | * 11/2023 | | F16K 27/065 |
| CN | 221780053 U | 9/2024 | | |
| DE | 10153222 B4 | 7/2012 | | |
| DE | 202014102795 U1 | * 6/2014 | | F16K 11/0743 |
| DE | 102021101096 A1 | 7/2022 | | |
| EP | 2816270 A2 | * 12/2014 | | F16K 11/0743 |
| FR | 2827356 A1 | * 1/2003 | | F16K 11/0856 |
| GB | 2579183 A | * 6/2020 | | F01P 7/16 |
| JP | H1144369 A | * 2/1999 | | |
| JP | 2002022041 A | * 1/2002 | | |
| WO | 2022057588 A1 | 3/2022 | | |
| WO | WO-2022258383 A1 | * 12/2022 | | F16K 11/0743 |
| WO | WO-2022258388 A1 | * 12/2022 | | F16K 11/0743 |
| WO | WO-2022258399 A1 | * 12/2022 | | F16K 11/0743 |

* cited by examiner

THROTTLE VALVE ROTOR 38

CONNECTING PASSAGEWAY

LOWER VALVE HOUSING COVER

VALVE HOUSING BODY

MAIN VALVE ROTOR THROUGH HOLES

MAIN VALVE ROTOR

*See Fig. 4B*

*See Fig. 4A*

THROTTLE ROTOR CAVITY    32

VALVE HOUSING BODY    20

MAIN ROTOR CAVITY    30

33

38A

34J

34A2

34A1

34B

34H

36A

31

34G

34F

34C

34D

34E

20S

34I

210

212

214

THERMAL FLUID CIRCUITS

212

VALVE HOUSING

210

222

UPPER VALVE HOUSING COVER

ACTUATOR

226

214

VALVE FLOW CONTROLLER

236

MAIN VALVE ROTOR

216

MAIN SEALING SYSTEM

MAIN BIASING ASSEMBLY

SEAL MEMBER

276

238

THROTTLE VALVE ROTOR

218

THROTTLE SEALING SYSTEM

THROTTLE BIASING ASSEMBLY

SEAL MEMBER

278

220

284

VALVE HOUSING BODY

230

MAIN ROTOR CAVITY

224

LOWER VALVE HOUSING COVER

THROTTLE ROTOR CAVITY

286

232

MAIN VALVE ROTOR 236

MAIN VALVE ROTOR COVER 244

MAIN VALVE ROTOR SHAFT 242

MAIN VALVE ROTOR BODY 240

MAIN SEALING SYSTEM 278

SEAL MEMBER

MAIN BIASING ASSEMBLY

LOCK TABS 264

THROTTLE ROTOR CAVITY

VALVE HOUSING BODY

MAIN ROTOR CAVITY

| MODE | LOOP 1 | LOOP 2 | LOOP 3 | LOOP 4 | BLOCKED |
|------|--------|--------|--------|--------|---------|
| A | 1, 4, 9 | 2, 3 | 5, 6 | 7, 8 | 10 |
| B | 1, 4, 10 | | | | 9 |
| C | 1, 4, 9, 10 | | | | |
| D | 1, 8 (9, 10) | 2, 5 | 3, 4 | 6, 7 | NONE |
| E | 1, 2 (9, 10) | 3, 6 | 4, 5 | 7, 8 | |
| F | 1, 8 (9, 10) | 2, 3 | 4, 7 | 5, 6 | |
| G | 1, 2 (9, 10) | 3, 4 | 5, 8 | 6, 7 | |
| H | 1, 6 (9, 10) | 2, 3 | 4, 5 | 7, 8 | |
| I | 1, 8 (9, 10) | 2, 7 | 3, 4 | 5, 6 | |
| J | 1, 2 (9, 10) | 3, 8 | 4, 5 | 6, 7 | |

*FIG. 16*

MAIN VALVE ROTOR
(FIRST POSITION)

MULTI-WAY VALVE
(MODE A)

THROTTLE VALVE ROTOR
(FIRST POSITION)

MAIN VALVE ROTOR (FIRST POSITION)

MULTI-WAY VALVE (MODE C)

THROTTLE VALVE ROTOR (THROTTLE CONFIGURATION)

MAIN VALVE ROTOR
(FOURTH POSITION)

MULTI–WAY VALVE
(MODE F)

THROTTLE VALVE ROTOR
(THROTTLE CONFIGURATION)

MULTI-WAY VALVE

PRIORITY CLAIM

This application claims priority to and the benefit of U.S. Provisional Patent Application No. 63/454,447, filed 24 Mar. 2023, the disclosure of which is now expressly incorporated herein by reference.

TECHNICAL FIELD

The present disclosure relates to multi-way valves, and particularly to multi-way valves for controlling the flow of heating and/or cooling fluid to various thermal fluid circuits in a vehicle. More particularly, the present disclosure relates to an electro mechanical multi-way valve.

BACKGROUND

Multi-way valves are used for controlling the flow of fluid to various thermal fluid circuits in a vehicle. However, there is a need for multi-way valves with an increased number of possible flow paths and improved sealing.

SUMMARY

The present disclosure provides a multi-way valve that controls the flow of heating and/or cooling fluid to different thermal fluid circuits in a vehicle with improved sealing. The multi-way valve includes a valve housing and a valve flow controller positioned in the housing to control the flow of fluid through the valve housing. The flow of heating and/or cooling fluid may be controlled to direct fluid to different thermal fluid circuits in a vehicle.

In the illustrative embodiments, the valve housing is shaped to define a first valve cavity, a second valve cavity in fluid communication with the first valve cavity, and a plurality of apertures in fluid communication with at least one of the first valve cavity and the second valve cavity. One valve rotor included in the valve flow controller is arranged in the first valve cavity and the other valve rotor included in the valve flow controller is arranged in the second valve cavity.

In the illustrative embodiments, the valve housing includes a valve housing body and a housing cover. The valve housing body is shaped to define the first valve cavity, the second valve cavity in fluid communication with the first valve cavity, and the plurality of apertures in fluid communication with at least one of the first valve cavity and the second valve cavity. The housing cover is coupled to the valve housing body to close openings of the first and second valve cavities.

In the illustrative embodiments, the valve flow controller includes a first valve rotor arranged in the first valve cavity of the valve housing body and a second valve rotor arranged in the second valve cavity. The first valve rotor is configured to rotate relative to the valve housing about a first rotor axis and the second valve rotor is configured to rotate relative to the valve housing about a second rotor axis. The second rotor axis is parallel to the first rotor axis.

In the illustrative embodiments, the first and second valve rotors cooperate to define a plurality of flow paths. The first and second valve rotors cooperate to define a plurality of flow paths when the first and second valve rotors are rotated about the respective rotor axes to a plurality of different predetermined positions to control a flow of fluid through the valve housing.

In the illustrative embodiments, the first valve rotor includes a plurality of first rotor through holes and the second valve rotor includes a plurality of second rotor through holes. The first rotor through holes each extend axially through the first valve rotor relative to the first rotor axis. The plurality of second rotor through holes each extend axially through the second valve rotor relative to the second rotor axis.

In the illustrative embodiments, the first valve rotor includes a first valve rotor body, a first valve rotor shaft, and a first valve rotor cover. The first valve rotor body extends circumferentially about the first rotor axis. The first valve rotor shaft extends axially away from the first valve rotor body along the first rotor axis. The first valve rotor cover is coupled to the first valve rotor body for rotation therewith.

In the illustrative embodiments, the first valve rotor body is formed to include the plurality of first rotor through holes. The plurality of first rotor through holes each extend axially through the first valve rotor body relative to the first rotor axis. The plurality of first rotor through holes align with different apertures included in the plurality of apertures when the first valve rotor is in one of the plurality of different predetermined positions to allow the flow of fluid therethrough.

In the illustrative embodiments, the first valve rotor cover is formed to define at least one chamber. The at least one chamber extends around adjacent first rotor through holes in the first valve rotor body when the first valve rotor cover is coupled to the first valve rotor body so as to interconnect the adjacent first rotor through holes in fluid communication with each other.

In the illustrative embodiments, the first valve rotor body includes a body plate that extends circumferentially about the first rotor axis and defines the plurality of first rotor through holes, an outer wall that extends circumferentially around an outer edge of the body plate and axially away from the body plate in the same direction as the first valve rotor shaft, and an inner wall that extends circumferentially about the first rotor axis and axially away from the body plate at a location radially inward of the outer wall. The first valve rotor cover is located between the outer wall and the inner wall of the first valve rotor body.

In the illustrative embodiments, the first valve rotor cover includes a cover plate and at least one flow divider shell. The cover plate extends circumferentially about the first rotor axis. The flow divider shell defines the at least one chamber.

In the illustrative embodiments, the first valve rotor body further includes a plurality of deflectable lock tabs. The plurality of deflectable lock tabs are configured to engage the valve rotor cover when the first valve rotor cover is in the engaged position on the first valve rotor body to block axial movement of the first valve rotor cover relative to the first valve rotor body once the first valve rotor cover is located in the engaged position.

In the illustrative embodiments, at least one of the plurality of deflectable lock tabs are located on the inner wall of the first valve rotor body. In the illustrative embodiment, at least one of the plurality of deflectable lock tabs is located on the outer wall of the first valve rotor body.

In the illustrative embodiments, the second valve rotor includes a second valve rotor plate, a second valve rotor wall, and a second valve rotor shaft. The second valve rotor plate extends circumferentially about the second rotor axis. The second valve rotor wall extends circumferentially around an outer edge of the second valve rotor plate and axially from the second valve rotor plate. The second valve rotor shaft extends away from the second valve rotor plate along the second rotor axis in the same direction as the second valve rotor wall.

In the illustrative embodiments, the second valve rotor plate is formed to include the plurality of second rotor through holes. The plurality of second rotor through holes each extend axially through the second valve rotor plate relative to the second rotor axis. The plurality of second rotor through holes at least partially align with different apertures included in the plurality of apertures when the second valve rotor is in one of the plurality of different predetermined positions to allow the flow of fluid therethrough. In the illustrative embodiments, one of the plurality of second rotor through holes extends circumferentially at least partway about the second valve axis.

In the illustrative embodiments, the multi-way valve further comprises a first sealing system including a plurality of first seal members coupled to the first valve rotor for rotation therewith and engaged with an axially facing surface of the valve housing body. At least one first seal member included in the plurality of first seal members extends around adjacent first rotor through holes in the first valve rotor body.

In the illustrative embodiments, the first sealing system further includes a first biasing assembly configured to selectively apply an axial force on the first valve rotor to urge the plurality of first seal members coupled to the first valve rotor toward valve housing body when the first valve rotor is in one of the plurality of different predetermined positions to improve sealing between the first valve rotor and the valve housing body.

In the illustrative embodiments, the multi-way valve further comprises a first sealing system including a first seal member coupled to the first valve rotor for rotation therewith and engaged with an axially facing surface of the valve housing body. The first seal member includes a seal base located axially between the first valve rotor body and the first valve rotor cover and extending circumferentially about the valve axis and a plurality of seal rings that each extend axially from the seal base through one of the first rotor through holes of the plurality of first rotor through holes to engage the axially facing surface of the valve housing body. The first seal member is formed to define a plurality of openings that each extend through the seal base and one of the seal rings.

In the illustrative embodiments, the first sealing system further includes a first biasing assembly configured to selectively apply an axial force on the first valve rotor to urge the first seal member toward the valve housing body when the first valve rotor is in one of the plurality of different predetermined positions to improve sealing between the first valve rotor and the valve housing body.

In the illustrative embodiments, the first biasing assembly includes cam ramps on an axially facing surface of the housing cover of the valve housing and a cam surface on the first valve rotor. The cam surface is configured to engage the cam ramps on the upper housing cover as the first valve rotor rotates about the first rotor axis to the plurality of different predetermined positions.

In the illustrative embodiments, the multi-way further comprises a second sealing system. The second sealing system includes a second seal member arranged axially between the valve housing body and the second valve rotor and a second biasing assembly configured to apply an axial force on the second valve rotor to urge the second valve rotor toward the second seal member.

In the illustrative embodiments, the second biasing assembly includes a bias member arranged around the second valve rotor shaft, a bias member cover arranged over the bias member and coupled to the second valve rotor shaft for rotation therewith, and a flange formed on the upper housing cover. The flange engages the bias member cover when the housing cover is coupled to the valve housing body to load the second biasing assembly when the second valve rotor is arranged in the second valve cavity.

With the multi-way valve of the present disclosure, a multi-way valve with an increased number of flow paths and improved sealing is provided. The first valve rotor and the second valve rotor cooperate to define the increased number of flow paths through the valve housing. This arrangement improves scaling between the plurality of apertures in the valve housing body and the through holes in the first and second valve rotors not only because the flow path is less complicated, but the first and second sealing systems increase engagement of the valve rotors with the corresponding seals located between the valve rotors and the valve housing to reduce leakage.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective diagrammatic view of a multi-way valve configured to control the flow of fluid to various thermal fluid circuits in a vehicle;

FIG. 2 is an exploded view of the multi-way valve of FIG. 1 showing the multi-way valve includes a valve housing, a valve flow controller, and first and second sealing systems configured to seal between the valve housing and the valve rotors of the valve flow controller, showing the valve housing includes a valve housing body with first and second valve cavities, an upper housing cover configured to be coupled to the valve housing body to close the first and second valve cavities, and a lower valve housing cover coupled to the vale housing body opposite the upper valve housing cover to close off a bottom opening to form a connecting passageway between the first and second valve cavities, and further showing the valve flow controller includes a first valve rotor—also referred to as a main valve rotor—configured to be arranged in the first valve cavity, a second valve rotor—also referred to as a throttle valve rotor—configured to be arranged in the second valve cavity, and an actuator coupled to the main and throttle valve rotors to drive rotation of the main and throttle valve rotors about the respective rotor axes to different predetermined positions to form a plurality of flow paths through the valve housing body of the valve housing as suggested in FIGS. 16A-J;

FIG. 3 is a perspective view of the multi-way valve of FIG. 1 with the upper housing cover removed to show the main valve rotor arranged in the first valve cavity and the throttle valve rotor arranged in the second valve cavity, and further showing the main valve rotor is formed to define a plurality of main rotor through holes that each extend axially through the main valve rotor to open into one aperture formed in the valve housing body and the throttle valve rotor is formed to define throttle valve through holes that each extend axially through the throttle valve rotor to open into one aperture formed in the valve housing body;

FIG. 4 is a cross-section view of the multi-way valve of FIG. 1 showing the main valve rotor through holes formed in the main valve rotor and the throttle valve rotor through holes formed in the throttle valve rotor align with apertures in the valve housing body when the main valve rotor and the throttle valve rotor are in one of the different predetermined positions to allow the flow of fluid therethrough, showing the first sealing system includes a plurality of first seal members formed with the main valve rotor for rotation therewith to provide a seal between the main valve rotor and the valve housing body, and further showing the lower valve housing cover is coupled to the valve housing body to form the connecting passageway that extends between one aperture that opens in the first valve cavity and another aperture that opens into the second valve cavity so that the first and second valve cavities are in fluid communication;

FIG. 4A is a detail view of FIG. 4 showing one of the first seal members formed on the main valve rotor extends from the main valve rotor and engages the valve housing body to provide the seal between the main valve rotor and the valve housing body so that leaks between the main valve rotor and the valve housing body are reduced as fluid flows through the first rotor though hole into the aperture in the valve housing body of the valve housing;

FIG. 4B is a detail view of FIG. 4 showing the second sealing system includes a second biasing assembly that is trapped between the throttle valve rotor and the valve housing cover so that the second biasing assembly applies an axial force on the throttle valve rotor;

FIG. 5 is an exploded view of the main valve rotor included in the valve flow controller of the multi-way valve of FIG. 3 showing the main valve rotor includes a main valve rotor body that extends circumferentially about the first rotor axis and is shaped to include the plurality of main rotor through holes, a main valve rotor shaft that extends axially away from the main valve rotor body along the first rotor axis and configured to couple to the actuator, and a main valve rotor cover configured to be coupled to the main valve rotor body so that a plurality of chambers formed in the main valve rotor cover extend around adjacent through holes in the main valve rotor body so as to interconnect the adjacent through holes in fluid communication with each other when the valve rotor cover is coupled to the main valve rotor body, showing the plurality of first seal members extend around individual main rotor through holes or around adjacent main rotor through holes formed in the main valve rotor body, and further showing the main valve rotor body has lock tabs that engage the main valve rotor cover to block axial movement of the main valve rotor cover relative to the main valve rotor body once the main valve rotor cover is located in an engaged position on the main valve rotor body as shown in FIGS. 4 and 4A;

FIG. 6 is an exploded view of the upper housing end cover and the main valve rotor included in the multi-way valve of FIG. 3 showing the first sealing system further includes a first biasing assembly configured to selectively apply an axial force on the main valve rotor to urge the main valve rotor toward the plurality of apertures formed in the valve housing body so as to force the first seal members of the first sealing system toward the valve housing body and into engagement with a bottom surface of the valve housing body when the main valve rotor is in one of the different predetermined positions to improve sealing between the main valve rotor and the valve housing body, and further showing the first biasing assembly includes cam ramps formed on an axially facing surface of the upper housing cover of the valve housing and a cam surface formed on the main valve rotor that is configured to engage the cam ramps on the housing cover as the main valve rotor rotates about the first rotor axis to the different predetermined positions;

FIG. 7 is an exploded view of the throttle valve rotor included in the valve flow controller of the multi-way valve of FIG. 3 showing the throttle valve rotor includes a throttle valve rotor plate that extends circumferentially about the second rotor axis and is shaped to define the throttle rotor through holes, a throttle valve rotor wall that extends circumferentially around an outer edge of the throttle valve rotor plate and axially away from the throttle valve rotor plate, and a throttle valve rotor shaft that extends away from the throttle valve rotor plate along the second rotor axis in the same direction as the throttle valve rotor wall, and further showing the second biasing assembly of the second sealing system includes a bias spring and a spring cover configured to be assembled over the throttle valve rotor shaft as shown in FIG. 4B;

FIG. 8 is a cross-section view of the throttle valve rotor with the assembled second biasing assembly of FIG. 7 showing the bias spring is arranged around the throttle valve rotor shaft of the throttle valve rotor so as to apply the axial force on the throttle valve rotor to urge the throttle valve rotor body toward a seal fixed to the valve housing body, and further showing the spring cover extends around the bias spring and couples to the throttle valve rotor for rotation therewith so that the bias spring is located between the spring cover and the throttle valve rotor;

FIG. 9 is a perspective view of the valve housing body included in the valve housing of the multi-way valve of FIG. 1 showing the valve housing body is formed to define the plurality of apertures spaced apart circumferentially about the first valve axis that align with the plurality of main rotor through holes when the main valve rotor is in the different predetermined positions to allow the flow of fluid therethrough;

FIG. 10 is a perspective diagrammatic view of another embodiment of a multi-way valve configured to control the flow of fluid to various thermal fluid circuits in a vehicle;

FIG. 11 is an exploded view of the multi-way valve of FIG. 10 showing the multi-way valve includes a valve housing having a valve housing body defining first and second valve cavities, an upper valve housing cover, and a lower valve housing cover, a valve flow controller having first and throttle valve rotors configured to be arranged in the respective valve cavities of the valve housing body and an actuator configured to drive rotation of the first and throttle valve rotors about the respective rotor axes to different predetermined positions to form a plurality of flow paths through the valve housing body of the valve housing as suggested in FIGS. 16A-J, and first and second sealing systems, and further showing the first sealing system includes a separate seal gasket configured to be clamped between a main valve rotor body and a main valve rotor cover of the main valve rotor as shown in FIG. 13 so that the seal gasket rotates therewith;

FIG. 12 is a perspective view of the multi-way valve of FIG. 10 with the upper housing cover removed to show the main valve rotor arranged in the first valve cavity and the throttle valve rotor arranged in the second valve cavity, and further showing the main valve rotor is formed to define a plurality of main rotor through holes that each extend axially through the main valve rotor to open into one aperture formed in the valve housing body and the throttle valve rotor is formed to define second rotor through holes that each extend axially through the throttle valve rotor to open into one aperture formed in the valve housing body;

FIG. 13 is a cross-section view of the multi-way valve of FIG. 10 showing the main valve rotor through holes formed in the main valve rotor and the throttle valve rotor through holes formed in the throttle valve rotor align with apertures in the valve housing body when the main valve rotor and the throttle valve rotor are in one of the different predetermined positions to allow the flow of fluid therethrough, showing the seal member included in the first sealing system is located axially between the main valve rotor body and the main valve rotor cover instead of being overmolded with the main valve rotor to provide a seal between the main valve rotor and the valve housing body, and further showing the lower valve housing cover is coupled to the valve housing body to form the connecting passageway that extends between one aperture that opens in the first valve cavity and another aperture that opens into the second valve cavity so that the first and second valve cavities are in fluid communication;

FIG. 13A is a detail view of FIG. 13 showing one of the first seal member is located axially between the main valve rotor body and the main valve rotor and extends through each of the main valve rotor through holes to engage the valve housing body to provide the seal between the main valve rotor and the valve housing body so that leaks between the main valve rotor and the valve housing body are reduced as fluid flows through the first rotor though hole into the aperture in the valve housing body of the valve housing;

FIG. 14 is an exploded view of the main valve rotor included in the valve flow controller of the multi-way valve of FIG. 13 showing the main valve rotor includes the main valve rotor body that extends circumferentially about the first rotor axis, a main valve rotor shaft that extends axially away from the main valve rotor body along the first rotor axis, and the main valve rotor cover configured to be coupled to the main valve rotor body so that a plurality of chambers formed in the main valve rotor cover extend around adjacent through holes in the main valve rotor body so as to interconnect the adjacent through holes in fluid communication with each other when the valve rotor cover is coupled to the main valve rotor body, and further showing the main valve rotor body has lock tabs that engage the main valve rotor cover to block axial movement of the main valve rotor cover and the seal gasket relative to the main valve rotor body once the main valve rotor cover is located in an engaged position on the main valve rotor body as shown in FIG. 13A;

FIG. 15 is a perspective view of the valve housing body included in the valve housing of the multi-way valve of FIG. 10 showing the valve housing body is formed to define a channel instead of two separate apertures so that when the main valve rotor is in one of the plurality of predetermined positions the valve housing body couples adjacent openings or chambers in fluid communication with each other;

Figure 16A:
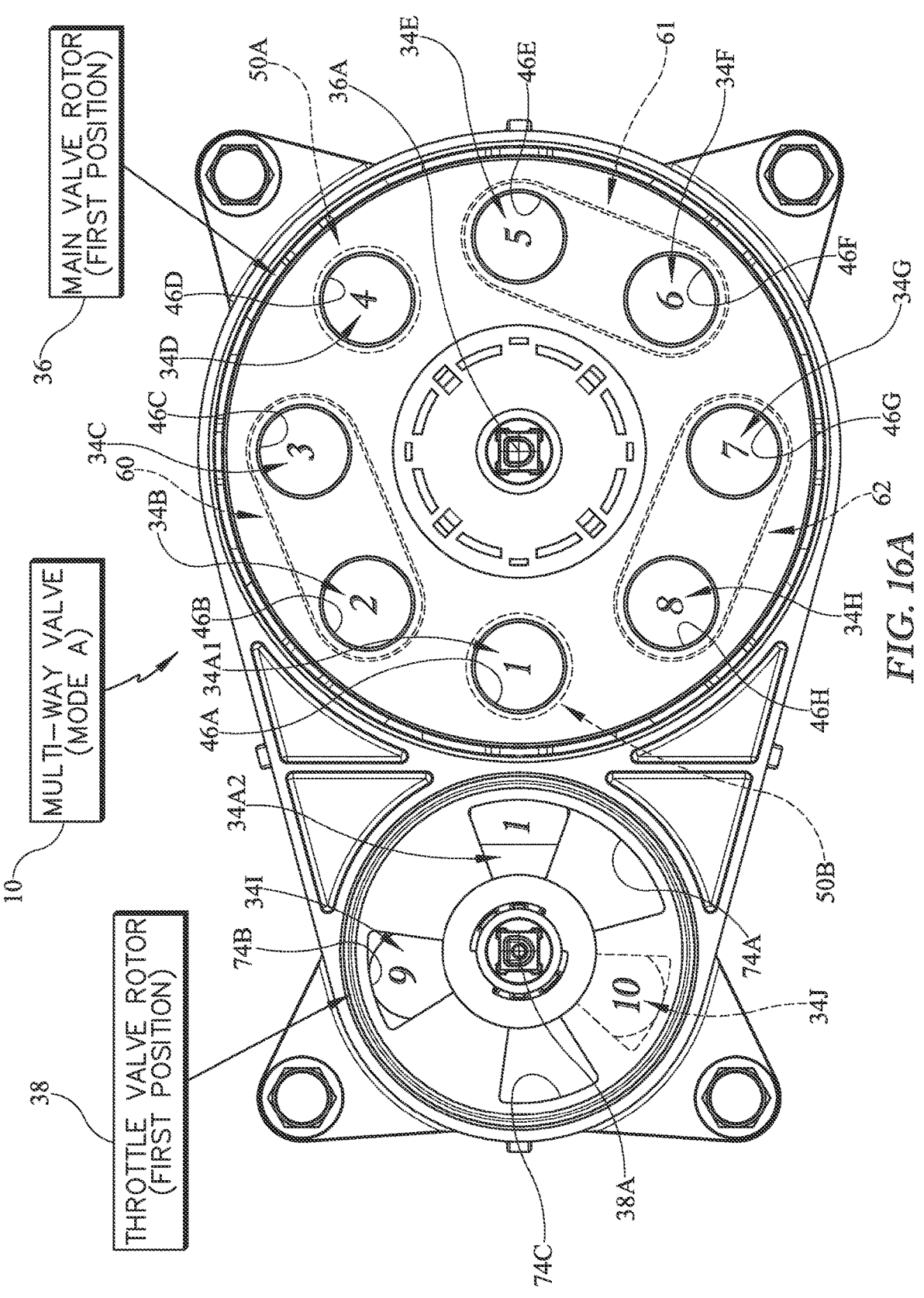
FIG. 16A is a top view of the multi-way valve in mode A as shown in FIG. 16 in which the main valve rotor is in a MAIN VALVE ROTOR FIRST position and the throttle valve rotor is in a THROTTLE VALVE ROTOR FIRST position.
Figure 16B:
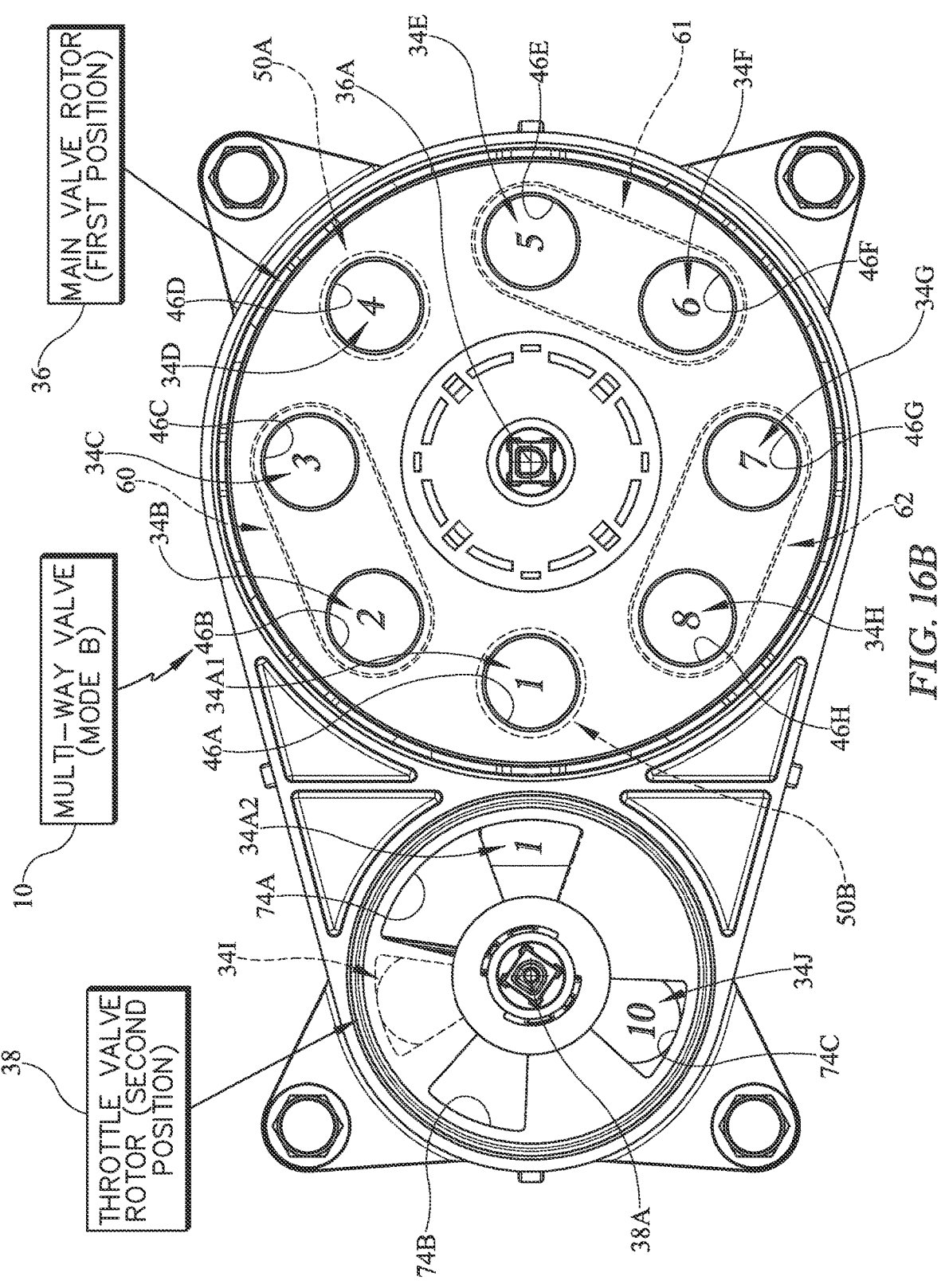
FIG. 16B is a top view of the multi-way valve in mode B as shown in FIG. 16 in which the main valve rotor stays in the MAIN VALVE ROTOR FIRST position, while the throttle valve rotor has moved to a THROTTLE VALVE ROTOR SECOND position.
Figure 16C:
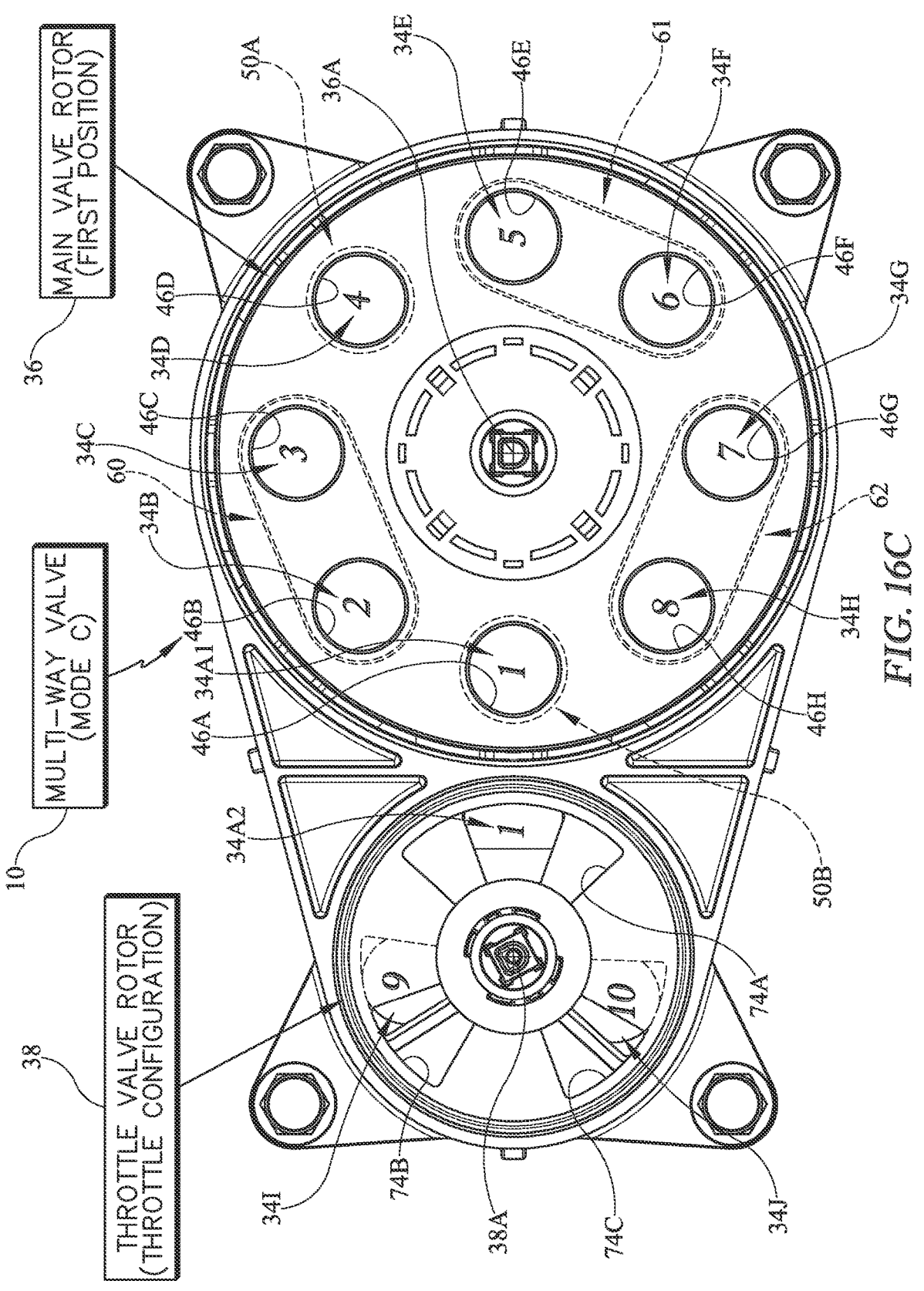
FIG. 16C is a top view of the multi-way valve in mode C as shown in FIG. 16 in which the main valve rotor stays in the MAIN VALVE ROTOR FIRST position and the throttle valve rotor moves to a THROTTLE configuration.
Figure 16D:
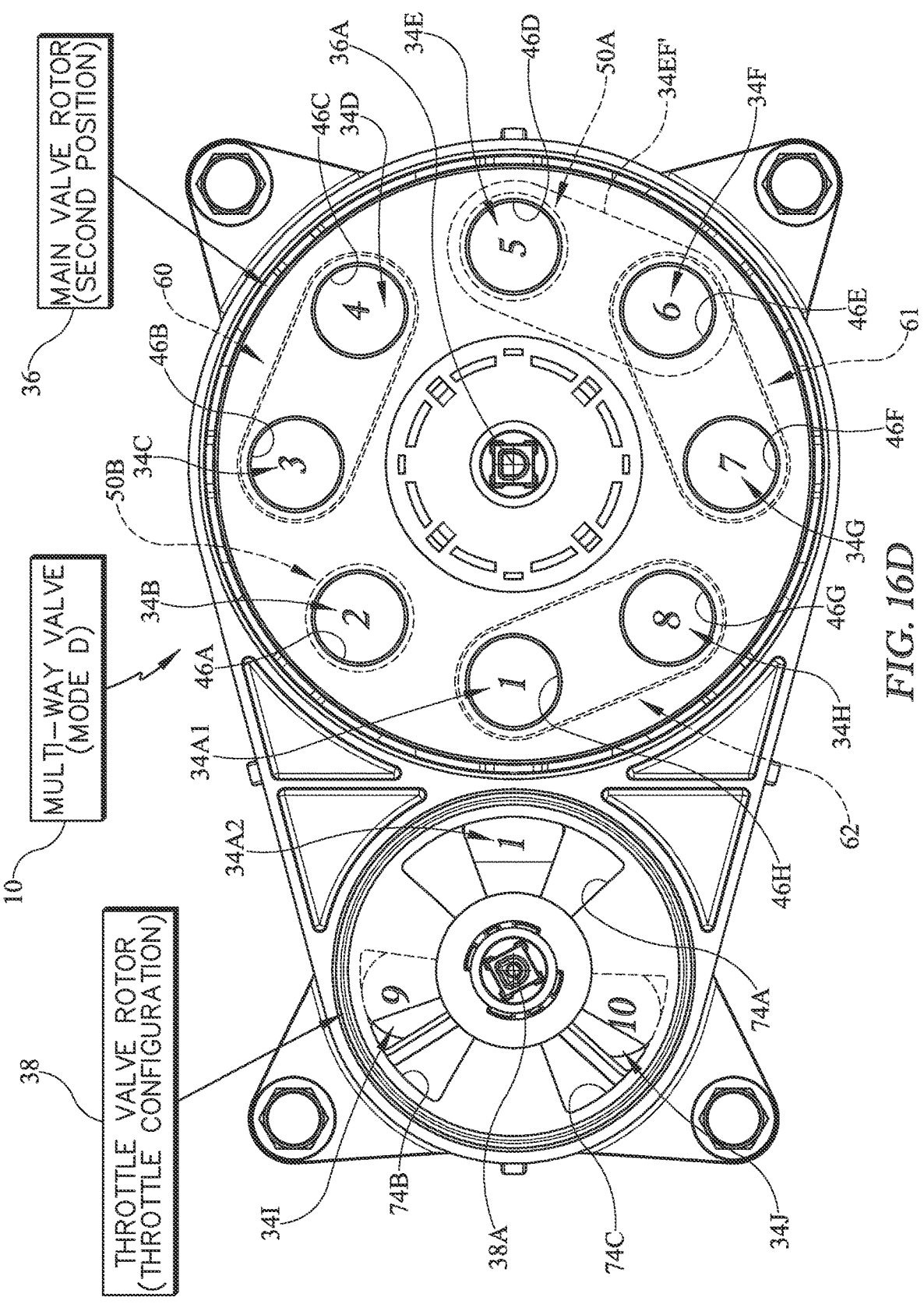
FIG. 16D is a top view of the multi-way valve in mode D as shown in FIG. 16 in which the throttle valve rotor stays in the THROTTLE configuration, while the main valve rotor moves to a MAIN VALVE ROTOR SECOND position.
Figure 16E:
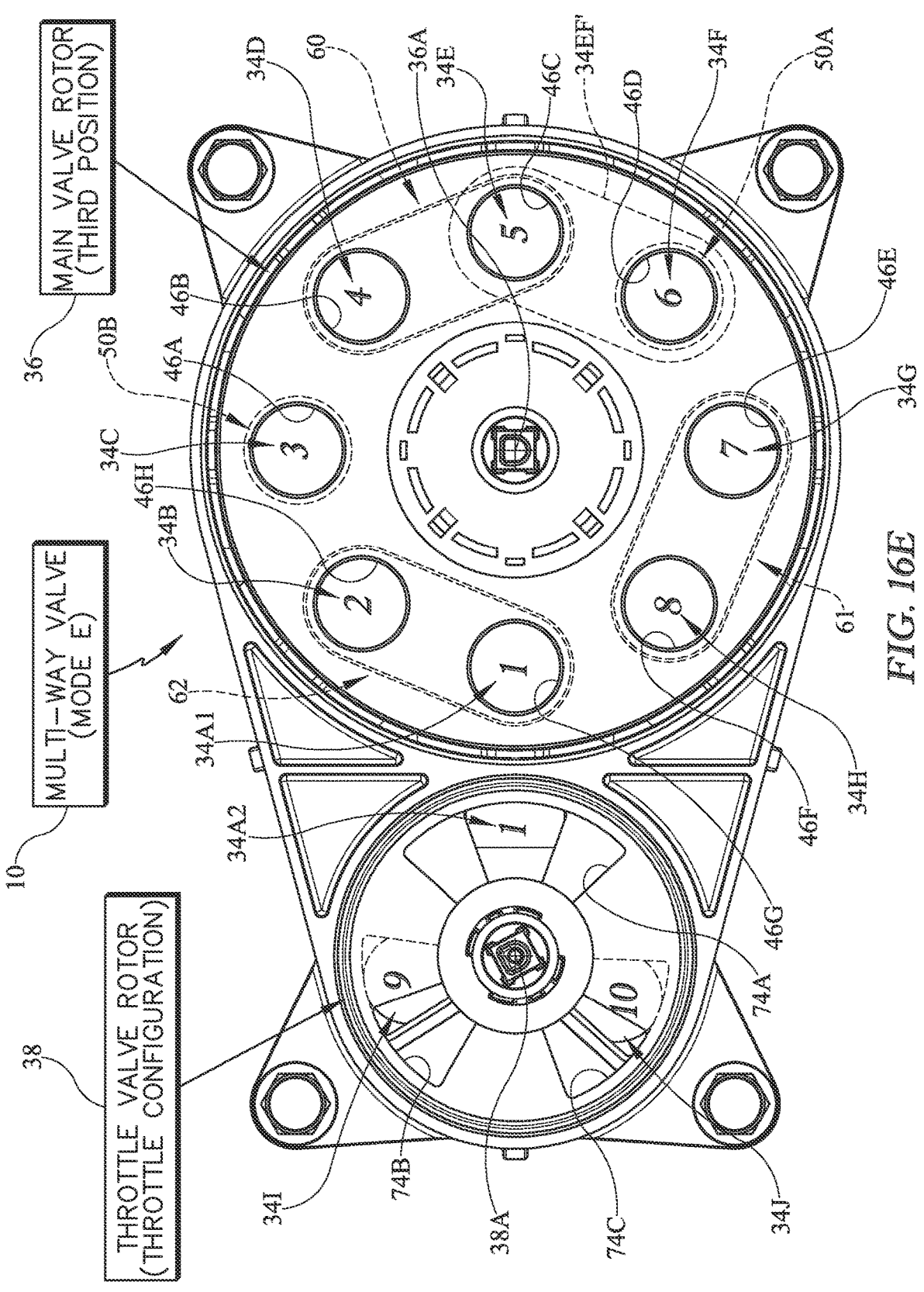
FIG. 16E is a top view of the multi-way valve in mode E as shown in FIG. 16 in which the throttle valve rotor stays in the THROTTLE configuration, while the main valve rotor moves to a MAIN VALVE ROTOR THIRD position.
Figure 16F:
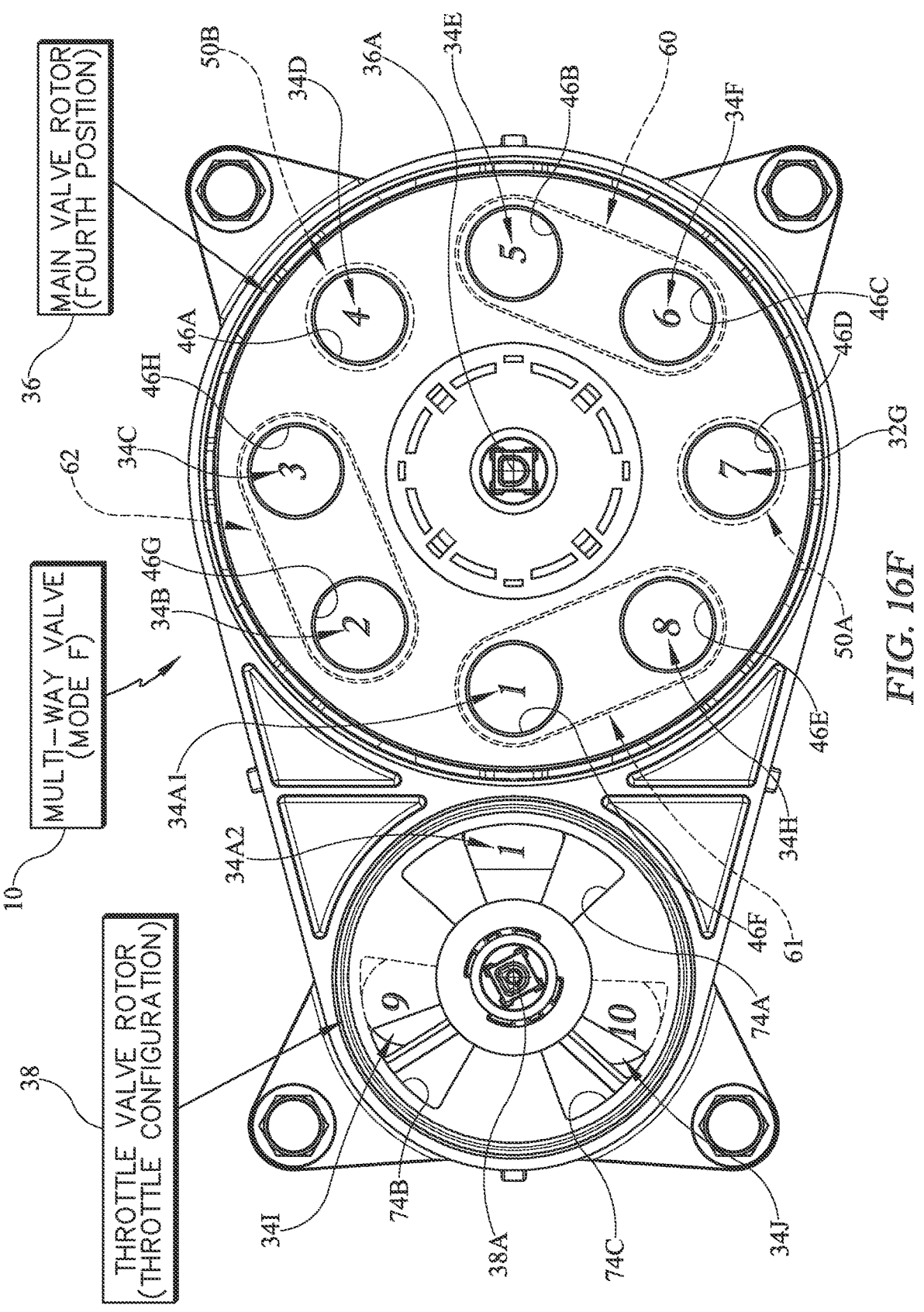
FIG. 16F is a top view of the multi-way valve in mode F as shown in FIG. 16 in which the throttle valve rotor stays in the THROTTLE configuration, while the main valve rotor moves to a MAIN VALVE ROTOR FOURTH position.
Figure 16G:
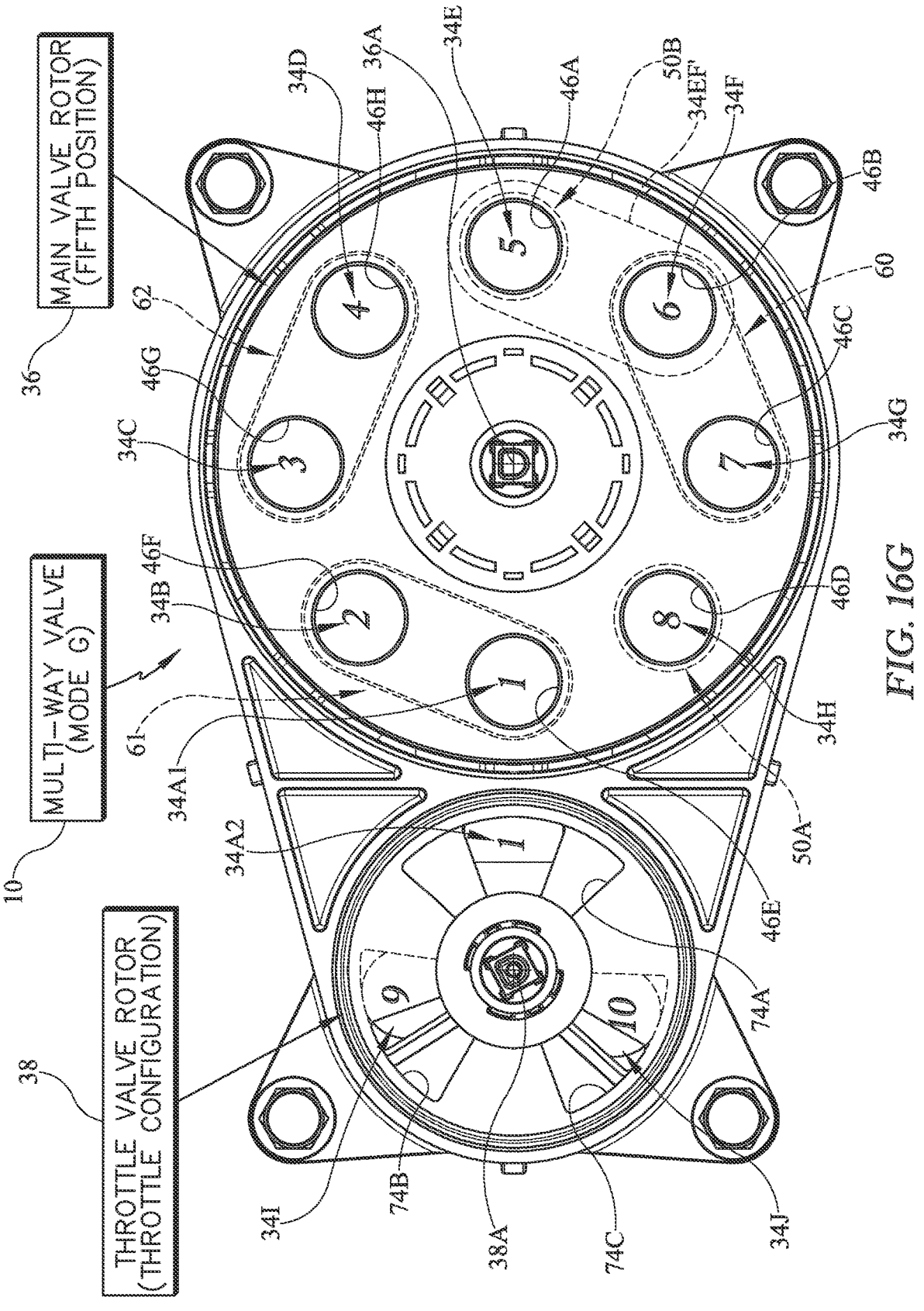
FIG. 16G is a top view of the multi-way valve in mode G as shown in FIG. 16 in which the throttle valve rotor stays in the THROTTLE configuration, while the main valve rotor moves to a MAIN VALVE ROTOR FIFTH position.
Figure 16H:
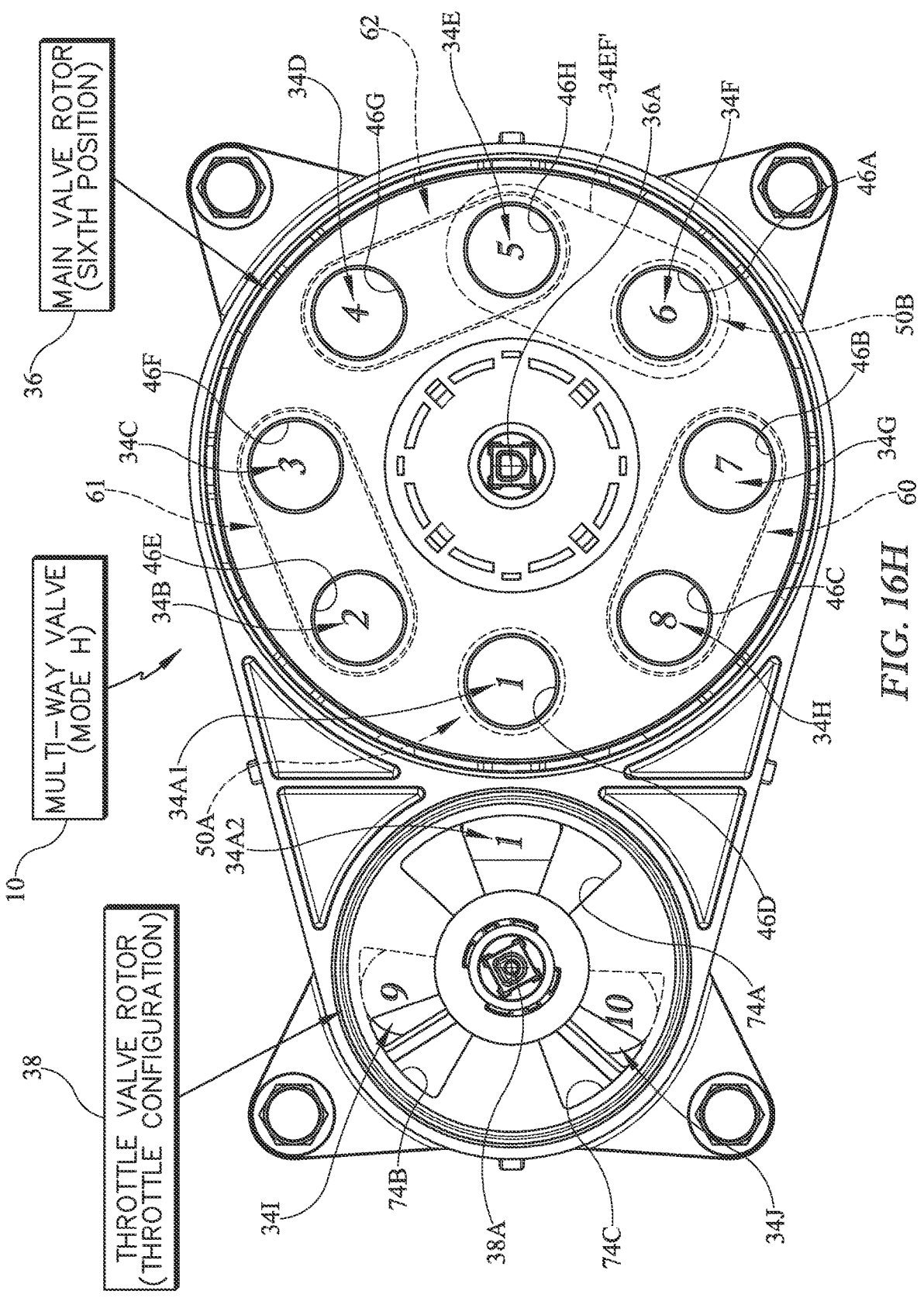
FIG. 16H is a top view of the multi-way valve in mode H as shown in FIG. 16 in which the throttle valve rotor stays in the THROTTLE configuration, while the main valve rotor moves to a MAIN VALVE ROTOR SIXTH position.
Figure 16I:
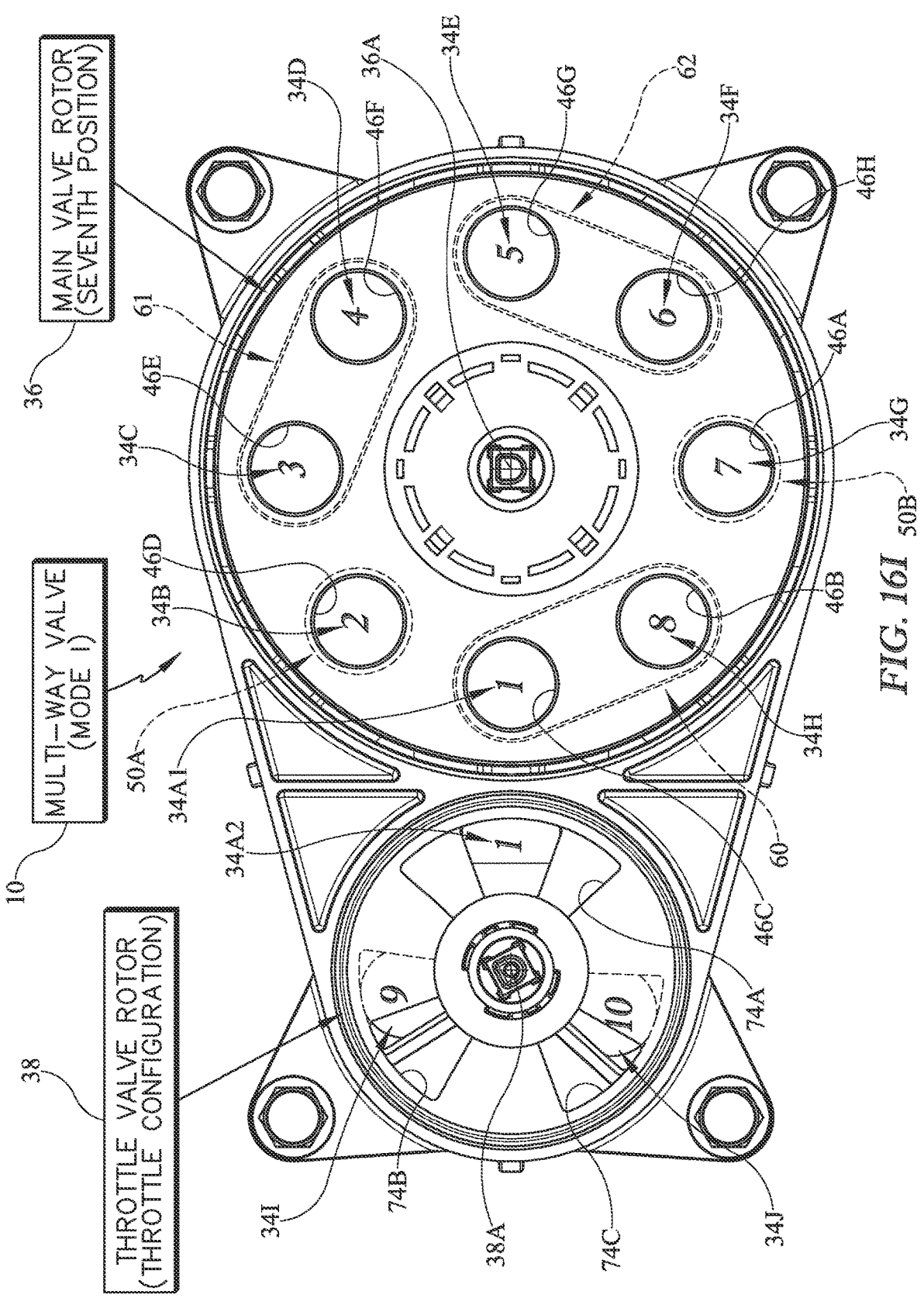
FIG. 16 is a table showing the different modes of the multi-way valve of FIGS. 1 and 10 and the different flow paths created at each of the different modes A-J.
Figure 16J:
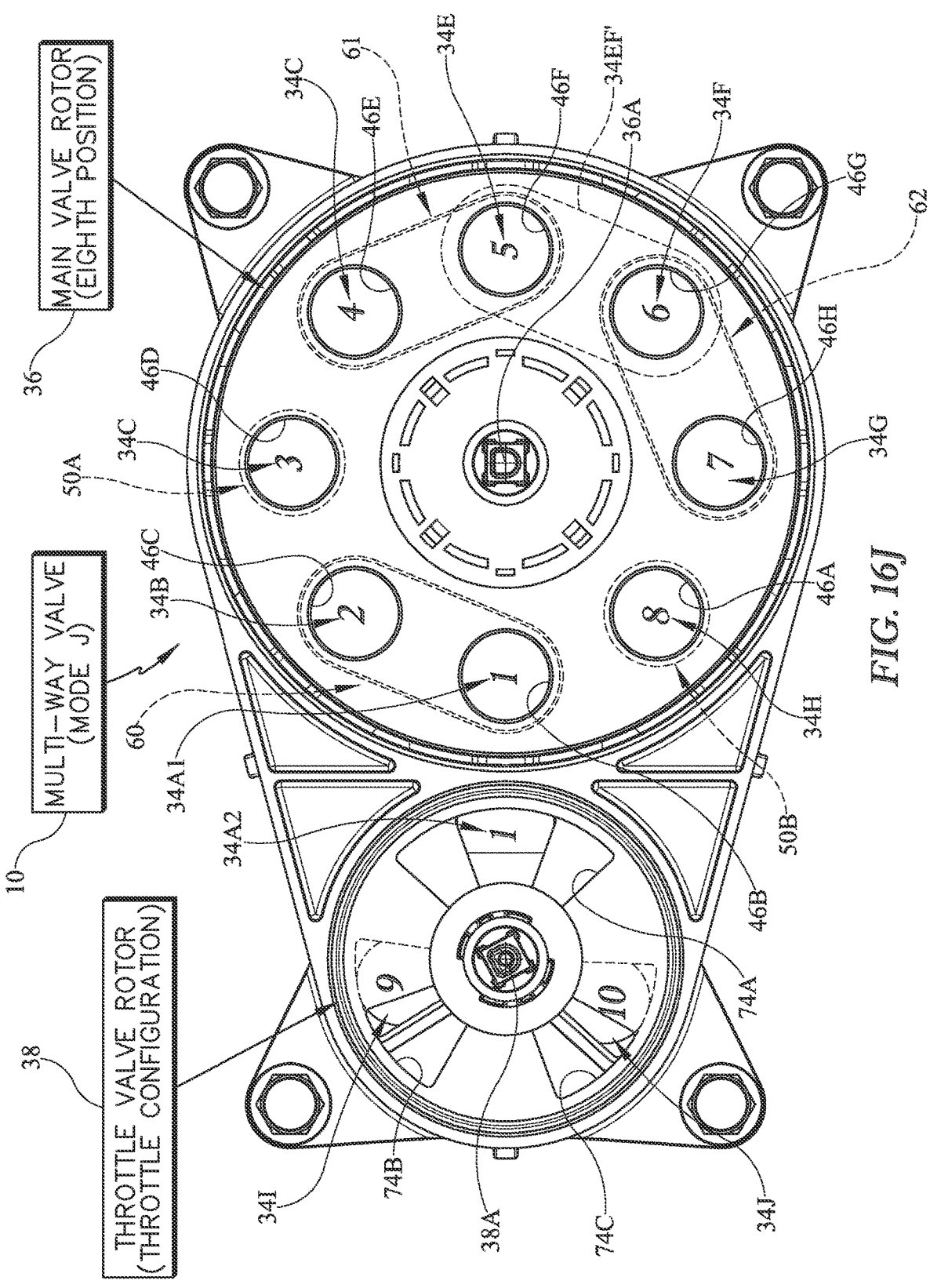

FIG. 16I is a top view of the multi-way valve in mode H as shown in FIG. 16 in which the throttle valve rotor stays in the THROTTLE configuration, while the main valve rotor moves to a MAIN VALVE ROTOR SEVENTH position; and FIG. 16J is a top view of the multi-way valve in mode J as shown in FIG. 16 in which the throttle valve rotor stays in the THROTTLE configuration, while the main valve rotor moves to a MAIN VALVE ROTOR EIGHTH position.

DETAILED DESCRIPTION

Figures 1, 2:
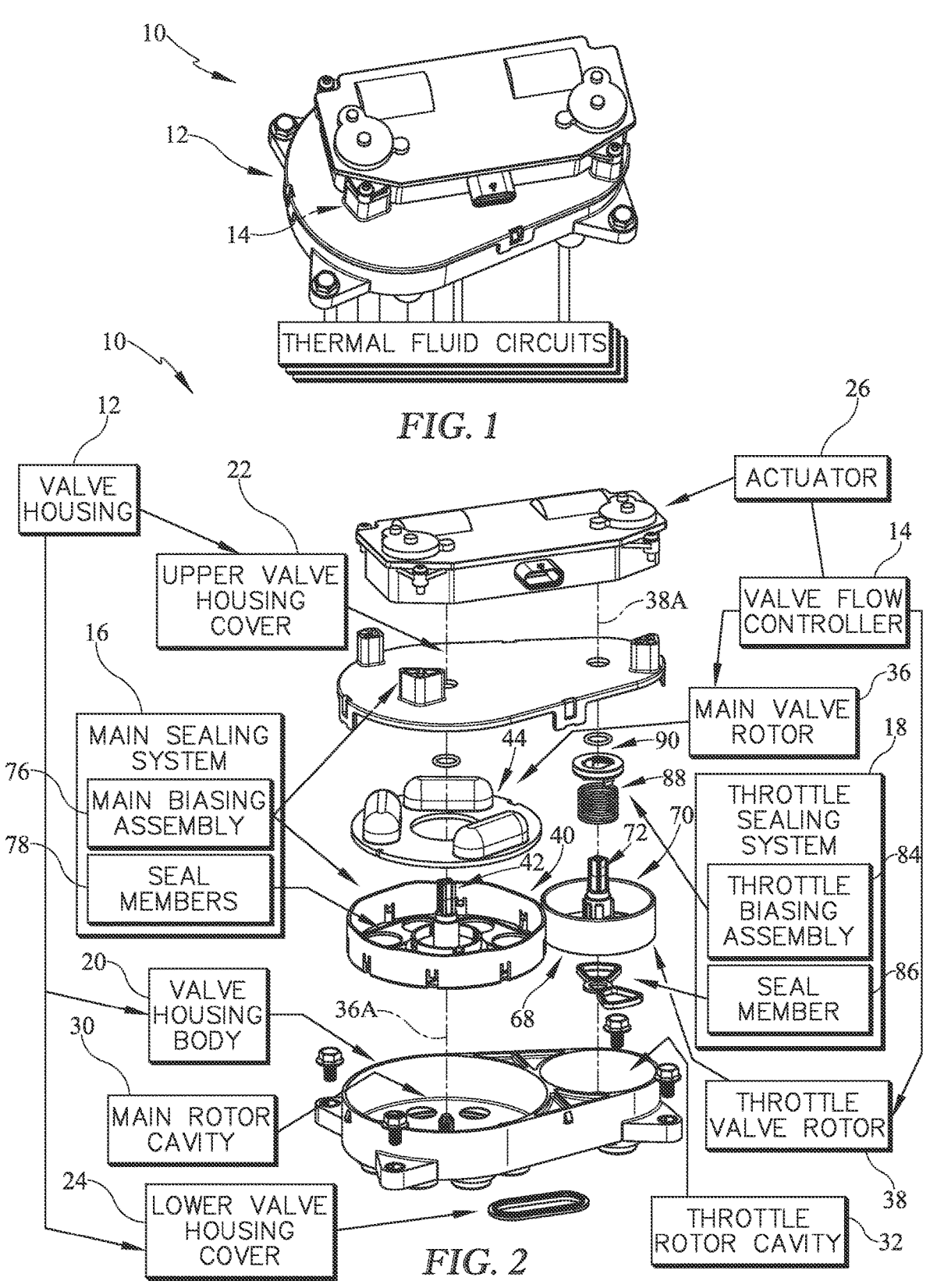

An illustrative multi-way valve 10 configured to control the flow of fluid to various thermal fluid circuits in a vehicle is shown in FIG. 1. The multi-way valve 10 includes a valve housing 12, a valve flow controller 14, and first and second sealing systems 16, 18. The valve flow controller 14 is arranged in the valve housing 12 to control flow through the valve housing 12. The first sealing system 16 is configured to seal between the valve housing 12 one of the valve rotors included in the valve flow controller 14. The second sealing system 18 is configured to seal between the valve housing 12 and the other valve rotor included in the valve flow controller 14.

The valve flow controller 14 includes a first valve rotor 36 arranged in a first valve cavity 30 formed by the valve housing 12, a second valve rotor 38 arranged in a second valve cavity 32 formed by the valve housing 12, and an actuator 26 as shown in FIGS. 1-9. The first valve rotor 36 is configured to rotate relative to the valve housing 12 about a first rotor axis 36A and the second valve rotor 38 is configured to rotate relative to the valve housing 12 about a second rotor axis 38A. The second rotor axis 38A is parallel to the first rotor axis 36A. The actuator 26 is coupled to the first and second valve rotors 36, 38 to drive rotation of the first and second valve rotors 36, 38 about the respective rotor axes 36A, 38A.

The first and second valve rotors 36, 38 cooperate to define a plurality of flow paths through the valve housing 12. As the first and second valve rotors 36, 38 are rotated about the respective rotor axes 36A, 38A to different set positions, the first and second valve rotors 36, 38 form different flow paths to control a flow of fluid through the valve housing 12 to different thermal fluid circuits.

The different modes of the multi-way valve 10 are shown in FIG. 16. The first and second valve rotors 36, 38 are in different predetermined positions in each of the different modes A-J to form the different flow paths through the valve housing 12 as shown in FIGS. 16A-J. The multi-way valve 10 and/or the actuator 26 may include a control unit that is preprogrammed with the different modes A-J.

The first valve rotor 36 is formed to include a plurality of first rotor through holes 46A-H and the second valve rotor 38 is formed to include a plurality of second rotor through holes 74A-C as shown in FIGS. 2-5 and 8. The first rotor through holes 46—also referred to as the main valve rotor through holes—each extend axially through the first valve rotor 36 relative to the first rotor axis 36A and are spaced apart circumferentially around the first rotor axis 36A.

Figure 3:
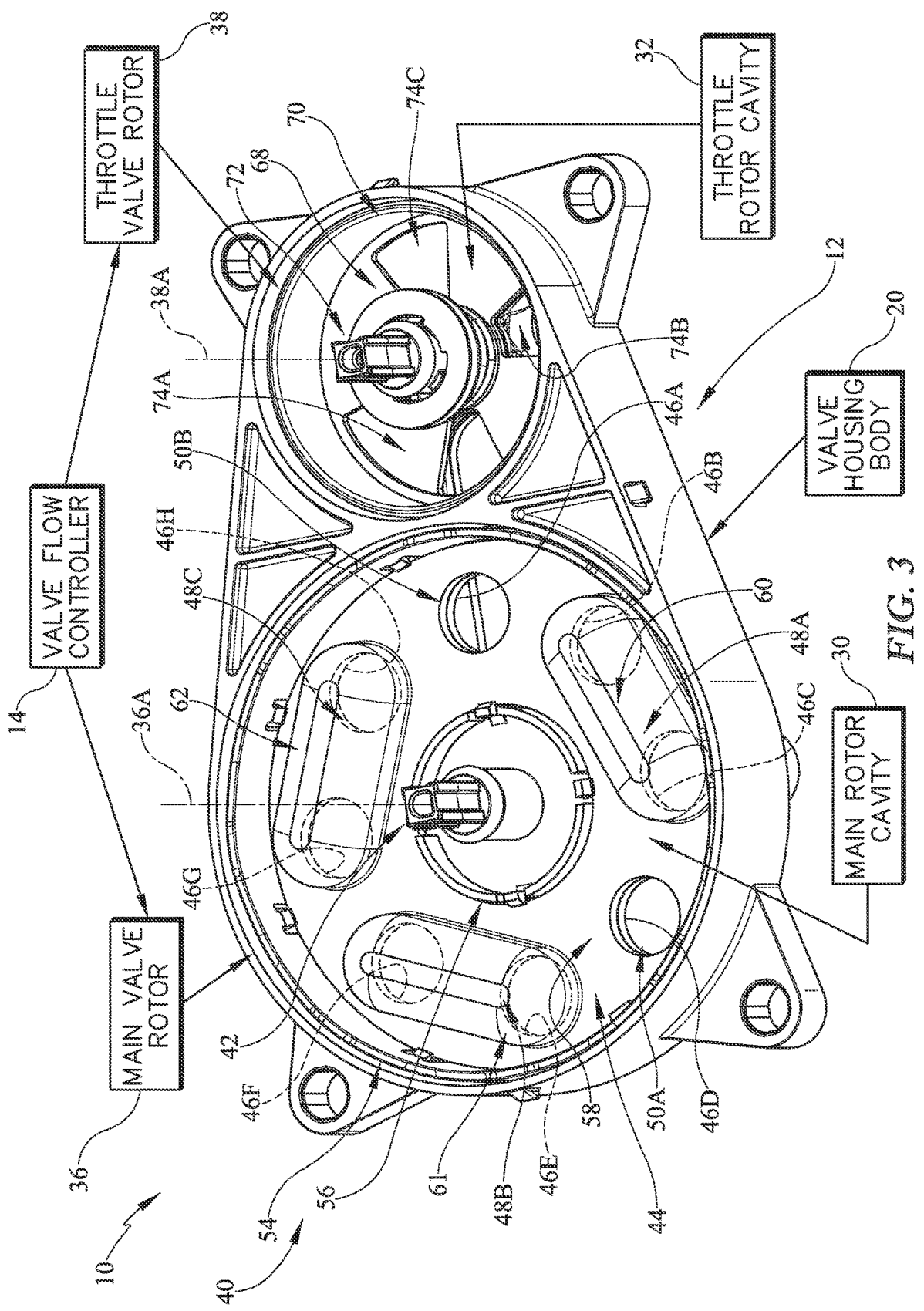

The second rotor through holes 74A-C—also referred to as the throttle valve rotor through holes—each extend axially through the second valve rotor 38 relative to the second rotor axis 38A and are spaced apart circumferentially around the second rotor axis 38A. The first throttle valve rotor through hole 74A extends circumferentially at least partway about the second rotor axis 38A as shown in FIG. 3. The first throttle valve rotor through hole 74A extends at least partway about the second rotor axis 38A so that the rotor through hole 74A remains aligned with the aperture 34A2 as the second valve rotor 38 rotates about the second rotor axis 38A between the different positions to allow fluid to flow therethrough. In the illustrative embodiment, each of the second rotor through holes 74A-C extends partway about the second rotor axis 38A.

The first rotor through holes 46A-H extend axially through the first valve rotor 36 so that the flow of fluid is able to flow axially through the first valve rotor 36 parallel to the first rotor axis 36A. The first rotor through holes 46A-H formed in the first valve rotor 36 align with different apertures 34A1, 34B, 34C, 34D, 34E, 34F, 34G, 34H included in a plurality of apertures 34A1, 34A2, 34B, 34C, 34D, 34E, 34F, 34G, 34H, 34I, 34J formed in the valve housing body 20 when the first valve rotor 36 is in one of the plurality of different predetermined positions to allow the flow of fluid therethrough. In this way, the first sealing system 16 uses first seal members for the different first rotor through holes 46A-H. Each of the first seal members are coupled for rotation with the first valve rotor 36 rather than being fixed with the valve housing 12.

Similarly, the second rotor through holes 74A-C extend axially through the second valve rotor 38 so that the flow of fluid is able to flow axially therethough parallel to the second rotor axis 38A. The second rotor through holes 74A-C formed in the second valve rotor 38 at least partially align with different apertures 34A2, 34I, 34J included in the plurality of apertures 34A1, 34A2, 34B, 34C, 34D, 34E, 34F, 34G, 34H, 34I, 34J when the second valve rotor 38 is in one of the plurality of different predetermined positions to allow the flow of fluid therethrough. The second sealing system 18 used a second seal member 86 coupled to the valve housing body 20 to seal around the apertures 34I, 34J in the valve housing body 20.

Other multi-way valves may have more complex passageways through the valve housing, which complicates sealing and increases the pressure drop as the fluid has to make more turns/changes direction more. The complex passageways may increase the potential for leaks across the different passageways. These valves may incorporate seals to seal between the passageways, but adding seals may require the actuator to have an increased torque capability to overcome the friction of the seals between the different components.

Moreover, adding more seals or sealing increases the overall manufacturing cost of the multi-way valve. Some valves may use a Teflon material for the seals. This may make manufacturing a multi-way valve expensive, especially as other valves have complex passageways with large, complex seals that may need large amounts of material.

The multi-way valve 10 of the present disclosure includes the first valve rotor 36 with axially extending through holes 46A-H so that the pressure drop is reduced. Additionally, the first seal members 78 are coupled to the first valve rotor 36 so that the first seal members 78 rotate with the first valve rotor 36 as the first valve rotor 36 rotates between the different predetermined positions. The first seal members engage an axially facing surface 20S of the valve housing 12 as the first valve rotor 36 rotates. In the illustrative embodiment, the first seal members 78 are over molded to the first valve rotor 36. This not only improves sealing between the holes 46A-H and the apertures 34A1, 34B, 34C, 34D, 34E, 34F, 34G, 34H in the valve housing body 20 because the flow path is less complicated, but the first sealing system 16 also uses less material for the seals 78 and reduces the friction between the first valve rotor 36 and the valve housing body 20.

Turning again to the valve housing 12, the valve housing includes a valve housing body 20 and an upper valve housing cover 22 as shown in FIGS. 1-6 and 9. The valve housing body 20 is coupled to a manifold of the thermal fluid circuits. The upper valve housing cover 22 is coupled to the valve housing body 20 to close top openings of the first and second valve cavities 30, 32.

The valve housing body 20 is formed to include a plurality of housing apertures 34A1, 34A2, 34B, 34C, 34D, 34E, 34F, 34G, 34H, 34I, 34J as shown in FIGS. 2-4 and 9. The plurality of housing apertures 34A1, 34A2, 34B, 34C, 34D, 34E, 34F, 34G, 34H, 34I, 34J are in fluid communication with different thermal fluid circuits. The plurality of housing apertures 34A1, 34A2, 34B, 34C, 34D, 34E, 34F, 34G, 34H, 34I, 34J are in fluid communication with at least one of the first valve cavity 30 and the second valve cavity 32 of the valve housing body 20. In the illustrative embodiment, the apertures 34B, 34C, 34D, 34E, 34F, 34G, 34H are in fluid communication with the first valve cavity 30 and the apertures 34I, 34J are in fluid communication with the second valve cavity 32. The apertures 34A1, 34A2 are in fluid communication with both the first and second valve cavities 30, 32 through the connecting passageway 34A defined by the valve housing 12.

Figure 4:
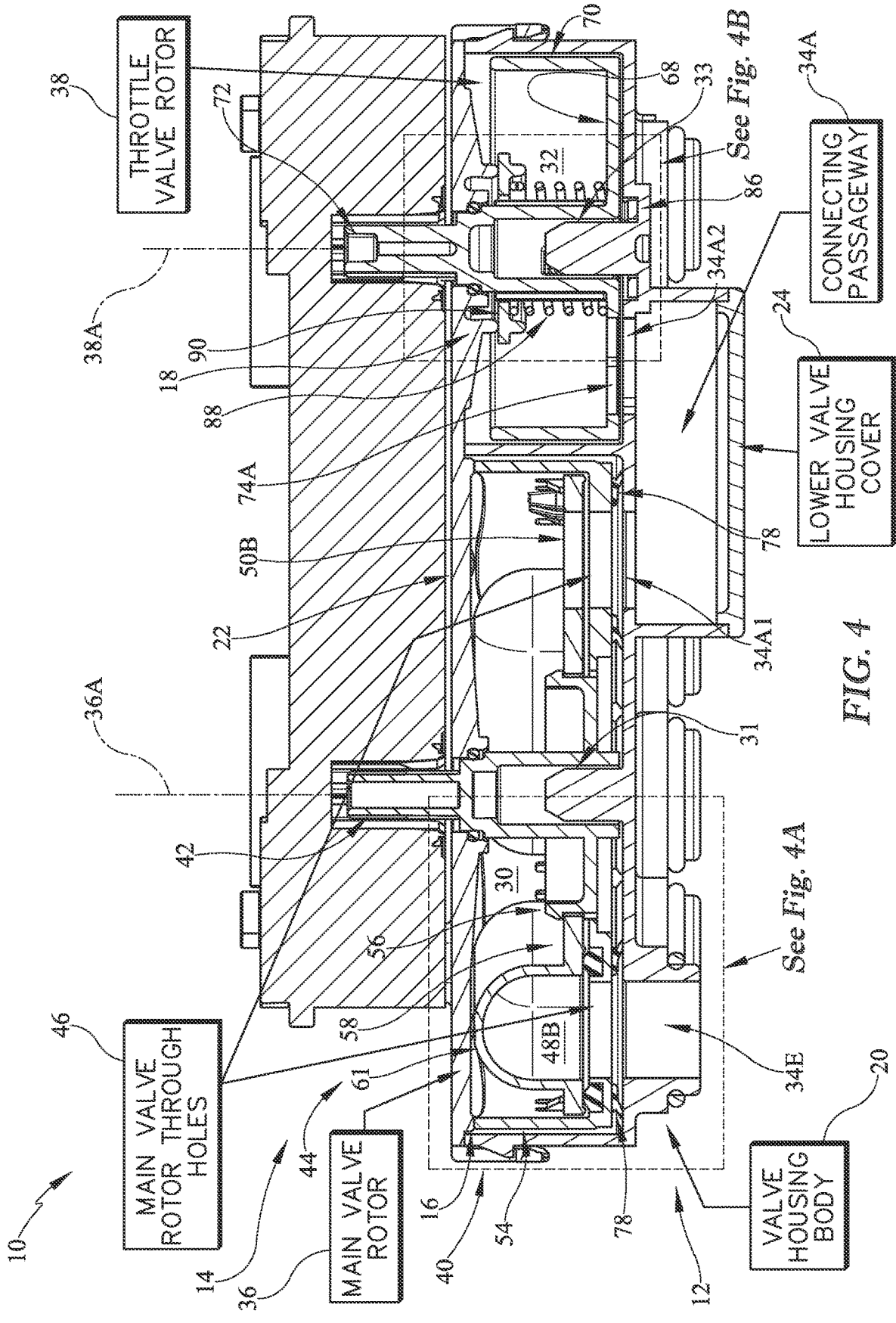

In the illustrative embodiment, the valve housing 12 further includes a lower valve housing cover 24 as shown in FIGS. 2 and 4. The lower valve housing cover 24 is coupled to the valve housing body 20 opposite the upper valve housing cover 22 to close off a bottom opening to form the connecting passageway 34A between the first and second valve cavities 30, 32. In some embodiments, the valve housing body 20 and the lower valve housing cover 24 are a single-piece component.

In some embodiments, the upper valve housing cover 22 and the lower valve housing cover 24 are each laser welded to the valve housing body 20. In some embodiments, the upper valve housing cover 22 and the lower valve housing cover 24 may be secured to the valve housing body 20 using another suitable method.

The valve housing body 20 is shaped to define the first valve cavity 30 and the second valve cavity 32 as shown in FIGS. 2-6 and 9. The second valve cavity 32 is in fluid communication with the first valve cavity 30 through the connecting passageway 34A defined between the valve housing body 20 and the lower valve housing cover 24.

The valve flow controller 14 includes the first valve rotor 36, also referred to as the main valve rotor 36, and the second valve rotor 38, also referred to as the throttle valve rotor 38 as shown in FIGS. 2-8. The main valve rotor 36 is arranged in the first valve cavity 30 of the valve housing body 20 and the throttle valve rotor 38 is arranged in the second valve cavity 32 of the valve housing body 20. The main valve rotor 36 is configured to rotate relative to the valve housing body 20 about the first rotor axis 36A and the throttle valve rotor 38 is configured to rotate relative to the valve housing body 20 about the second rotor axis 38A.

The first and second valve rotors 36, 38 cooperate to define a plurality of flow paths through the valve housing body 20. As the first and second valve rotors 36, 38 are rotated about the respective rotor axes 36A, 38A to different set positions, the first and second valve rotors 36, 38 form different flow paths to control the flow of fluid through the housing passageways a of the valve housing body 20.

The main valve rotor 36 includes a main valve rotor body 40, a main valve rotor shaft 42, and a main valve rotor cover 44 as shown in FIGS. 2-6. The main valve rotor body 40 extends circumferentially about the first rotor axis 36A. The main valve rotor shaft 42 extends axially away from the main valve rotor body 40 along the first rotor axis 36A and couples to the actuator 26. In the illustrative embodiment, the valve housing body 20 defines a first rod 31 that extends axially from the bottom surface 20S of the valve housing body 20 into the main valve rotor shaft 42 to position and center the main valve rotor 36 in the main valve cavity 30. The main valve rotor cover 44 is coupled to the main valve rotor body 40 for rotation therewith.

The main valve rotor body 40 is shaped to include the plurality of main rotor through holes 46A-H and the main valve rotor cover 44 is shaped to define a plurality of chambers 48A-C and a plurality of cover through holes 50A, 50B. The cover chambers 48A-C each extend around adjacent through holes 46A-H in the main valve rotor body 40 when the main valve rotor cover 44 is coupled to the main valve rotor body 40 so as to interconnect the adjacent through holes 46A-H in fluid communication with each other. The cover through holes 50A, 50B each align with one of the main rotor through holes 46A-H when the main valve rotor cover 44 is coupled to the main valve rotor body 40.

In the illustrative embodiment, the main valve rotor cover 44 has three cover chambers 48A-C and two cover through holes 50A, 50B. In some embodiments, the number of cover chambers 48A-C and the number of cover through holes may be different. For example, the main valve rotor cover 44 may include two cover chambers 48 and four cover through holes 50A, 50B in some embodiments.

The main valve rotor body 40 includes a main body plate 52, an outer wall 54, and an inner wall 56 as shown in FIGS. 2-6. The main body plate 52 extends circumferentially about the first rotor axis 36A and shaped to define the plurality of main rotor through holes 46A-H that extend axially therethrough. The outer wall 54 extends circumferentially around an outer edge of the main body plate 52. The outer wall 54 extends axially from the outer edge of the main body plate 52 in the same direction as the main valve rotor shaft 42. The inner wall 56 extends circumferentially about the first rotor axis 36A and axially away from the main body plate 52 at a location radially inward of the outer wall 54.

Figure 5:
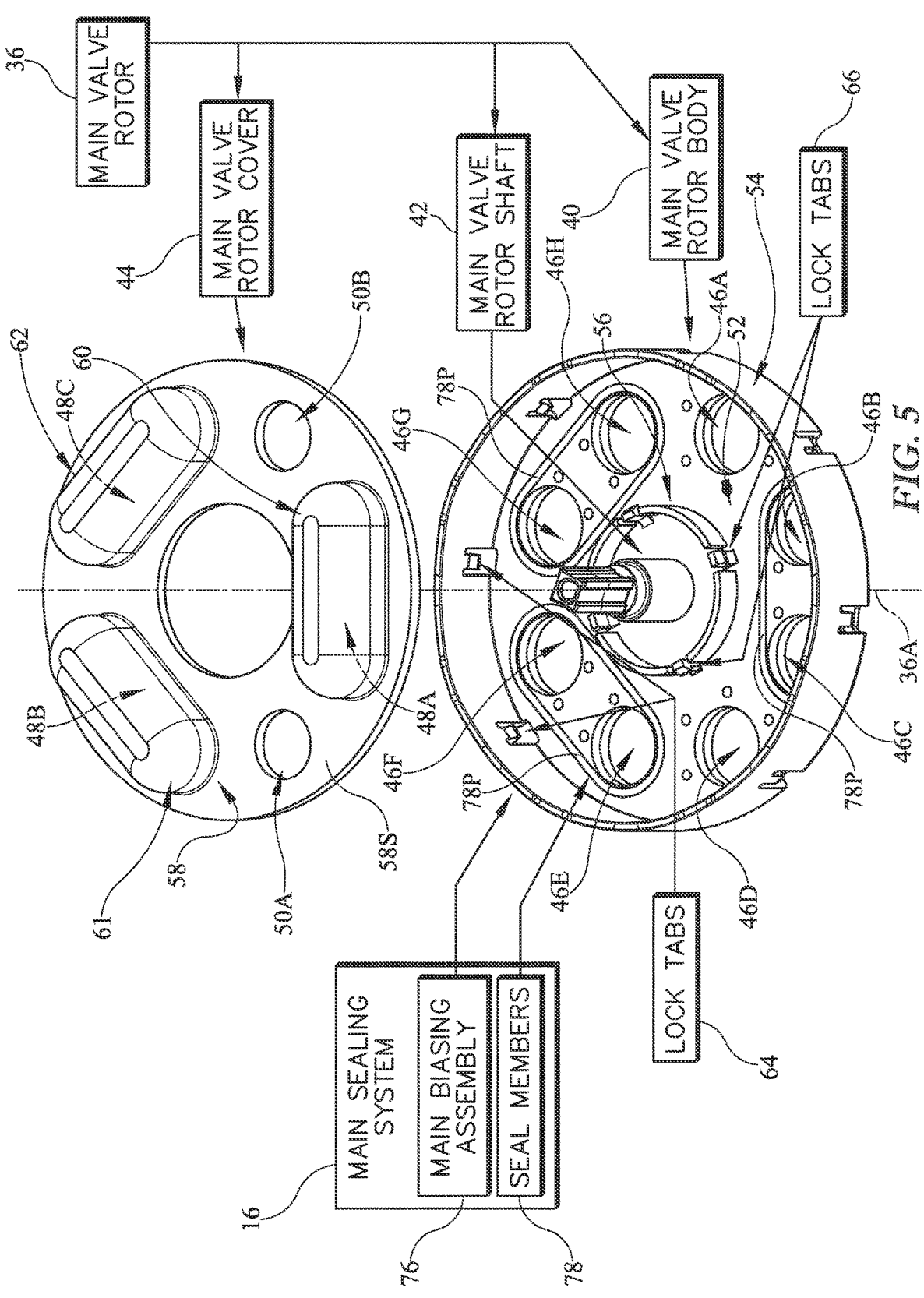

The main valve rotor cover 44 includes a cover plate 58 and flow divider shells 60, 61, 62 as shown in FIGS. 2-6. The cover plate 58 extends circumferentially about the first rotor axis 36A. Each of the flow divider shells 60, 61, 62 defines one of the cover chambers 48A-C and is configured to extend around at least two through holes 46 in the main body plate 52. The first flow divider shell 60 defines the first cover chamber 48A, the second flow divider shell 61 defines the second cover chamber 48B, and the third flow divider shell 62 defines the third cover chamber 48C as shown in FIGS. 3 and 5.

As the main valve rotor 36 rotates, the main body plate 52 and the main valve rotor cover 44 cooperate to control the flow to each aperture 34A1, 34B, 34C, 34D, 34E, 34F, 34G, 34H included in the housing apertures 34A1, 34A2, 34B, 34C, 34D, 34E, 34F, 34G, 34H, 34I, 34J as shown in FIGS. 16A-J. The main body plate 52 controls the flow to each aperture 34A1, 34B, 34C, 34D, 34E, 34F, 34G, 34H by aligning different first rotor through holes 46A-H with different apertures 34A1, 34B, 34C, 34D, 34E, 34F, 34G, 34H in the different predetermined positions. The cover chambers 48A-C of the main valve rotor cover 44 each connect adjacent through holes 46A-H in fluid communication so that the flow of fluid may only flow therebetween. The cover chambers 48A-C of the flow divider shells 60, 61, 62 interconnect the adjacent through holes 46, but block direct fluid communication to the first valve cavity 30.

In the illustrative embodiment, the main valve rotor cover 44 is a separate component that is coupled to the main valve rotor body 40. The main valve rotor body 40 has locking means for selectively fixing the main valve rotor cover 44 to the main valve rotor body 40 in an engaged position on the main valve rotor body 40 so that the main valve rotor cover 44 is blocked from axial movement relative to the main valve rotor body 40 once the main valve rotor cover 44 is located in the engaged position.

In the illustrative embodiment, each of the outer wall 54 and the inner wall 56 of the main valve rotor body 40 defines the locking means for selectively fixing the main valve rotor cover 44 to the main valve rotor body 40 in the engaged position on the main valve rotor body 40. The locking means of the main valve rotor body 40 includes deflectable lock tabs 64 on the outer wall 54 and deflectable lock tabs 66 on the inner wall 56 of the main valve rotor body 40 as shown in FIGS. 2-5. Each deflectable lock tab 64, 66 is configured to engage the main valve rotor cover 44 when the main valve rotor cover 44 is in the engaged position on the main valve rotor body 40 to block axial movement of the main valve rotor cover 44 relative to the main valve rotor body 40 once the main valve rotor cover 44 is located in the engaged position on the main valve rotor body 40.

Each deflectable lock tab 64, 66 includes a deflectable lock arm 64A, 66A and a protrusion 64P, 66P as shown in FIGS. 2-5. The deflectable lock arm 64A extends axially from the outer wall 54 toward the main body plate 52, while the deflectable lock arm 66A extends axially from the main body plate 52 at the inner wall 56. The protrusions 64P, 66P extend radially from the corresponding deflectable lock arm 64A, 66A towards each other.

Each protrusions 64P, 66P defines a guide ramp 64S, 66S that engages the main valve rotor cover 44 as the main valve rotor cover 44 is moved into the engaged position to cause the deflectable lock arms 64A, 66A to deflect from a normal position to a deflected position so that the main valve rotor cover 44 may move past the protrusions 64P, 66P. Once the main valve rotor cover 44 moves past the terminal ends of the protrusions 64P, 66P, the deflectable lock arms 64A, 66A move back to the normal positions so that the protrusions 64P, 66P engage an upper surface 58S of the cover plate 58 to block axial movement of the main valve rotor cover 44 to fix the main valve rotor cover 44 with the main valve rotor body 40.

The throttle valve rotor 38 includes a throttle valve rotor plate 68, a throttle valve rotor wall 70, and a throttle valve rotor shaft 72 as shown in FIGS. 2-8. The throttle valve rotor plate 68 extends circumferentially about the second rotor axis 38A. The throttle valve rotor wall 70 extends circumferentially around an outer edge of the throttle valve rotor plate 68. The throttle valve rotor wall 70 extends axially from the outer edge of the throttle valve rotor plate 68. The throttle valve rotor shaft 72 extends away from the throttle valve rotor plate 68 along the second rotor axis 38A in the same direction as the throttle valve rotor wall 70. In the illustrative embodiment, the valve housing body 20 defines a second rod 33 that extends axially from the bottom surface 20S of the valve housing body 20 into the throttle valve rotor shaft 72 to position and center the throttle valve rotor 38 in the throttle valve cavity 32.

The throttle valve rotor plate 68 is formed to define the plurality of throttle rotor through holes 74A-C as shown in FIGS. 3-8. Each of the throttle valve rotor through holes 74A-C extends axially through the throttle valve rotor plate 68 and circumferentially partway about the second rotor axis 38A.

As the throttle valve rotor 38 rotates, the throttle valve rotor plate 68 controls the amount of fluid flowing through the apertures 34A2, 34I, 34J included in the plurality of housing apertures 34A1, 34A2, 34B, 34C, 34D, 34E, 34F, 34G, 34H, 34I, 34J. The throttle valve rotor plate 68 partially opens, fully opens, or closes the apertures 34A2, 34I, 34J in the different predetermined positions to control therethrough. The throttle valve rotor plate 68 partially opens or closes the apertures 34A2, 34I, 34J in the different predetermined positions by partially or fully covering the apertures 34A2, 34I, 34J. In some positions, a portion of the throttle valve rotor plate 68 covers the apertures 34A2, 34I, 34J to block the flow of fluid therethrough.

The first sealing system 16, also referred to as the main sealing system 16, includes a first biasing assembly 76 and the plurality of first seal members 78 as shown in FIGS. 2-6. The first seal members 78 are coupled to the first valve rotor 36 for rotation therewith. The plurality of first seal members 78 engage with the axially facing surface 20S of the valve housing body 20. The first biasing assembly 76 is configured to selectively apply an axial force on the main valve rotor 36 to urge the main valve rotor 36 toward the plurality of apertures 34A1, 34A2, 34B, 34C, 34D, 34E, 34F, 34G, 34H, 34I, 34J formed in the valve housing body 20 so as to force the first seal members 78 toward the valve housing body 20 and into engagement with a bottom surface 20S of the valve housing body 20 when the main valve rotor 36 is in one of the different predetermined positions to improve sealing between the main valve rotor 36 and the valve housing body 20.

In the illustrative embodiment, the first seal members 78 are overmolded onto the first valve rotor body 40 of the first valve rotor 36. In other embodiments, the first seal members 78 may be another suitable seal coupled to the first valve rotor 36. In some embodiments, the first seal members 78 may be press-fit seals. In some embodiments, the first seal members 78 may be O-ring seal. In other embodiments, the first seal members 78 may be another suitable seal.

Figure 6:
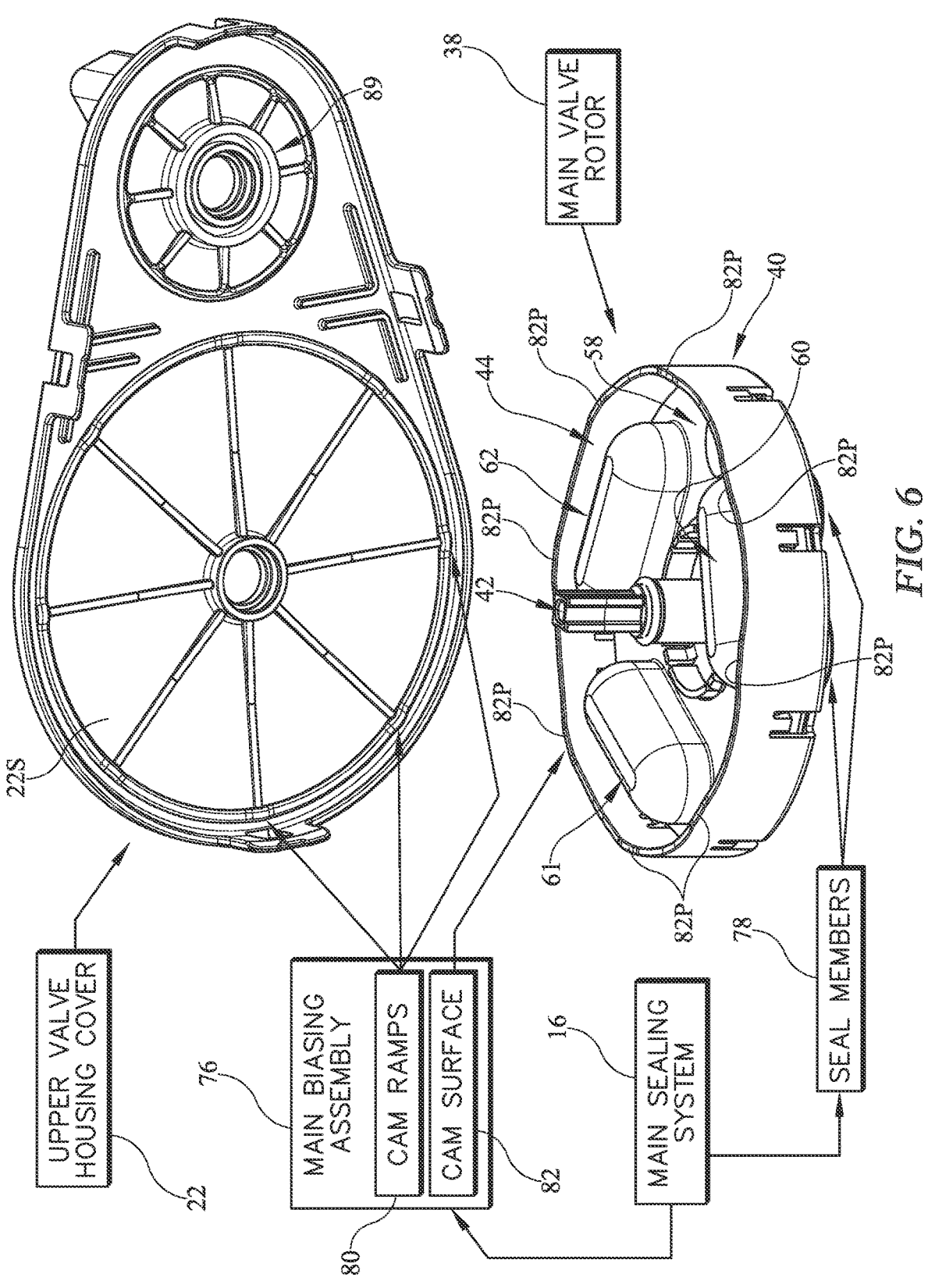

The first biasing assembly 76 includes cam ramps 80 formed on an axially facing surface 22S of the upper valve housing cover 22 of the valve housing 12 and a cam surface 82 formed on the main valve rotor 36 as shown in FIG. 6.

The cam surface 82 formed on the main valve rotor 36 is configured to engage the cam ramps 80 on the upper valve housing cover 22 as the main valve rotor 36 rotates about the first rotor axis 36A to the different predetermined positions so that the main valve rotor 36 is urged toward the plurality of apertures 34A1, 34A2, 34B, 34C, 34D, 34E, 34F, 34G, 34H formed in the valve housing body 20 at the different predetermined positions.

In this way, the cam ramps 80 and cam surface 82 act to reduce the torque needed to turn the main valve rotor 36 between the different predetermined positions. Other valves use a constant torque in that the rotor is always loaded. The constant torque may adversely affect the longevity of the valve. The main valve rotor 36 includes the first biasing assembly 76 so that the main valve rotor 36 is loaded and unloaded as it rotates between the different predetermined positions.

The cam ramps 80 are formed on the axially facing surface 22S of the upper valve housing cover 22, while the cam surface 82 is defined by an edge of the outer wall 54 of the main valve rotor body 40 as shown in FIG. 6. Each of the cam ramps 80 is raised from the surface 22S at about 45-degree intervals around the first rotor axis 36A. The cam surface 82 is also raided at about 45-degree intervals around the first rotor axis 36A. In some embodiments, the cam ramps 80 may be formed by the edge of the outer wall 54 of the main valve rotor body 40, while the cam surface 82 is defined by the axially facing surface of the upper valve housing cover 22.

Figure 4A:
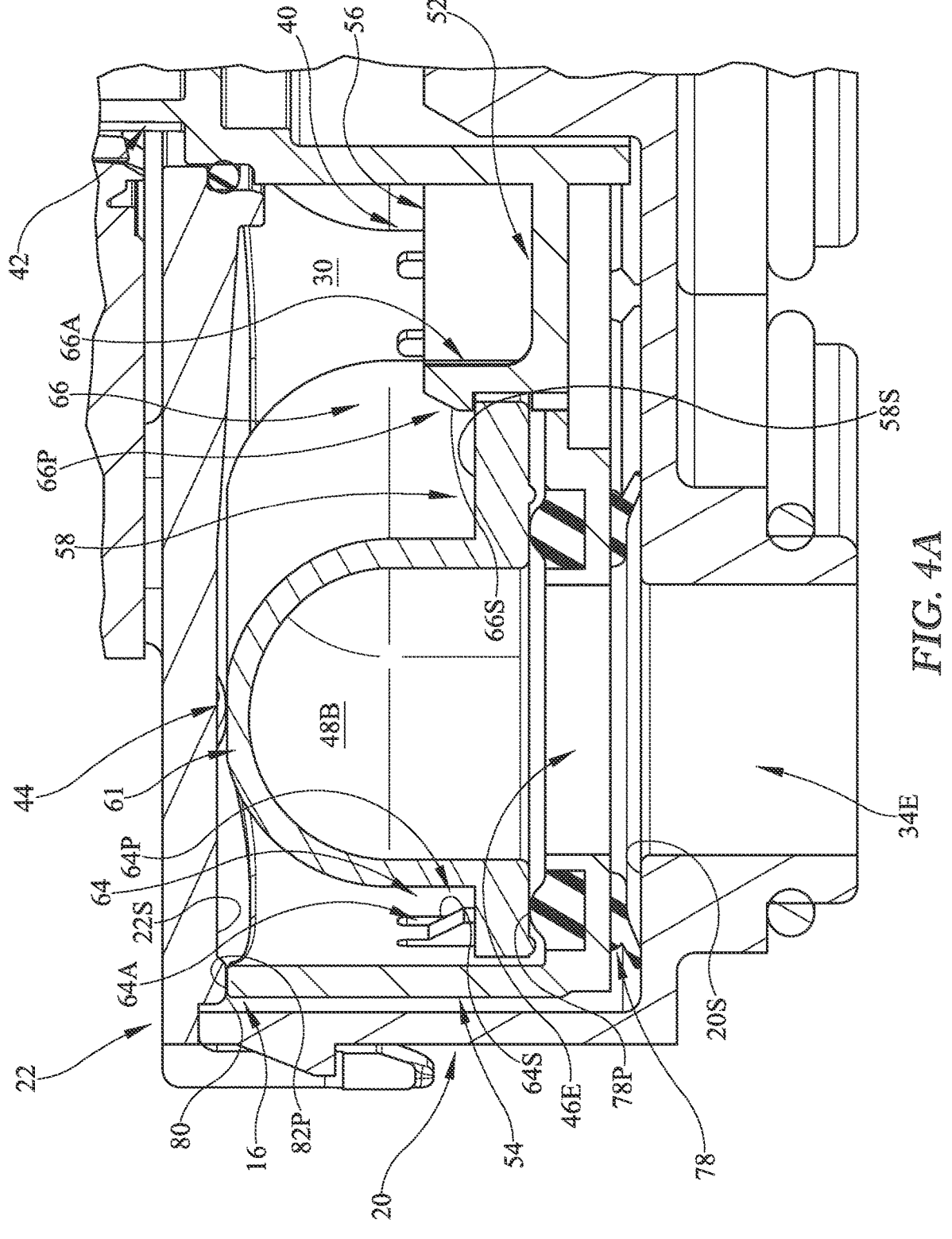

Each of the cam ramps 80 is circumferentially aligned with one of the apertures 34A1, 34B, 34C, 34D, 34E, 34F, 34G, 34H of the valve housing body 20, while the raised sections of the cam surface 82 are aligned with the through holes 46A-H as shown in FIGS. 4A and 6. In this way, the axial force F will be applied at the different predetermined positions so as to seal around the corresponding apertures. Then as the main valve rotor 36 rotates about the first rotor axis 36A, the raised portions 82P of the cam surface 82 disengage the cam ramps 80 so that at least a portion of the axial force is removed and the torque needed to rotate the main valve rotor 36 is reduced.

The cam ramps 80 are fixed on the upper valve housing cover 22. The cam surface 82 on the main valve rotor 36 rides against the cam ramps 80 in a circular manner and applies downward axial force to the main valve rotor 36 when aligned with the high points 82P of the cam surface 82 as shown in FIG. 4A. This axial force generates a contact pressure between the first seal members with the bottom surface 20S of the valve housing body 20. The increased contact pressure and resulting increase in friction are only generated in the predetermined positions of the different modes A-J. As the main valve rotor 36 rotates, the cam ramps 80 are disengaged with the high points 82P of the cam surface 82 so that the axial force is removed or reduced such that the main valve rotor 36 is unloaded. This reduces friction and torque on the actuator during movement between seal points.

The plurality of first seal members 78 include some seal members 78 that extend around a single through hole 46A, 46D and others that extend around adjacent through holes 46B, 46C, 46E, 46F, 46G, 46H in the main valve rotor body 40 as shown in FIG. 5. The seal members 78 that extend around adjacent through holes 46B, 46C, 46E, 46F, 46G, 46H form a perimeter seal 78P around the corresponding through holes 46B, 46C, 46E, 46F, 46G, 46H that matches up with the corresponding flow divider shell 60, 61, 62 when the main valve rotor cover 44 is coupled to the main valve rotor body 40 as shown in FIGS. 4A and 5. The perimeter seals 78P of the seal members 78 engage the main valve rotor cover 44 when the main valve rotor cover 44 is coupled to the main valve rotor body 40 so that the cover chambers 48A-C are separately sealed off from the main valve cavity 30.

The second sealing system 18, also referred to as the throttle sealing system 18, includes a second biasing assembly 84 and the a second seal member 86 as shown in FIGS. 2-6. The second biasing assembly 84 is configured to apply an axial force on the second valve rotor 38 to urge the second valve rotor 38 toward the second seal member 86 and the bottom surface 20S of the valve housing body 20 and into engagement with the second seal member 86.

Figures 10, 11:
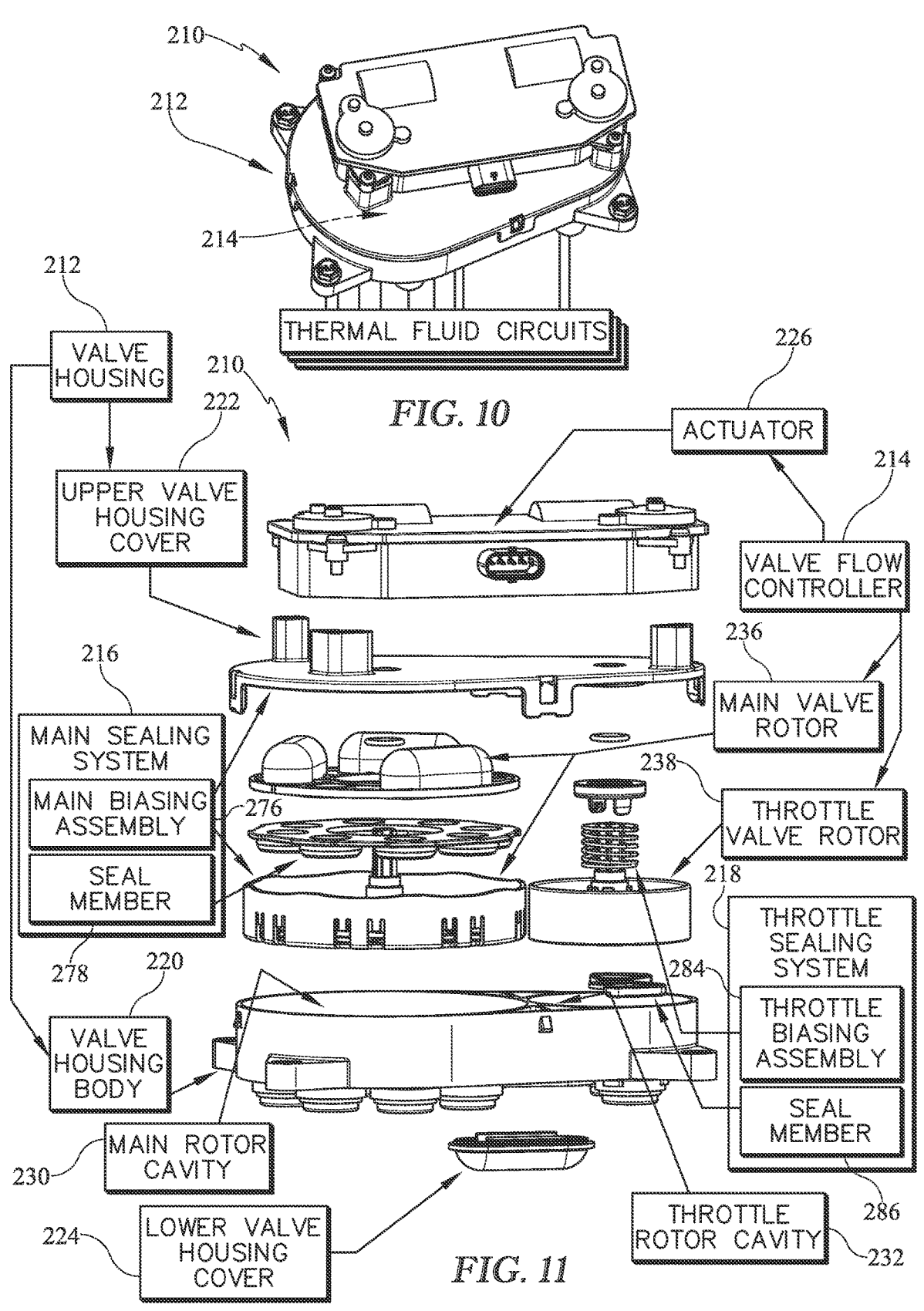
Figure 12:
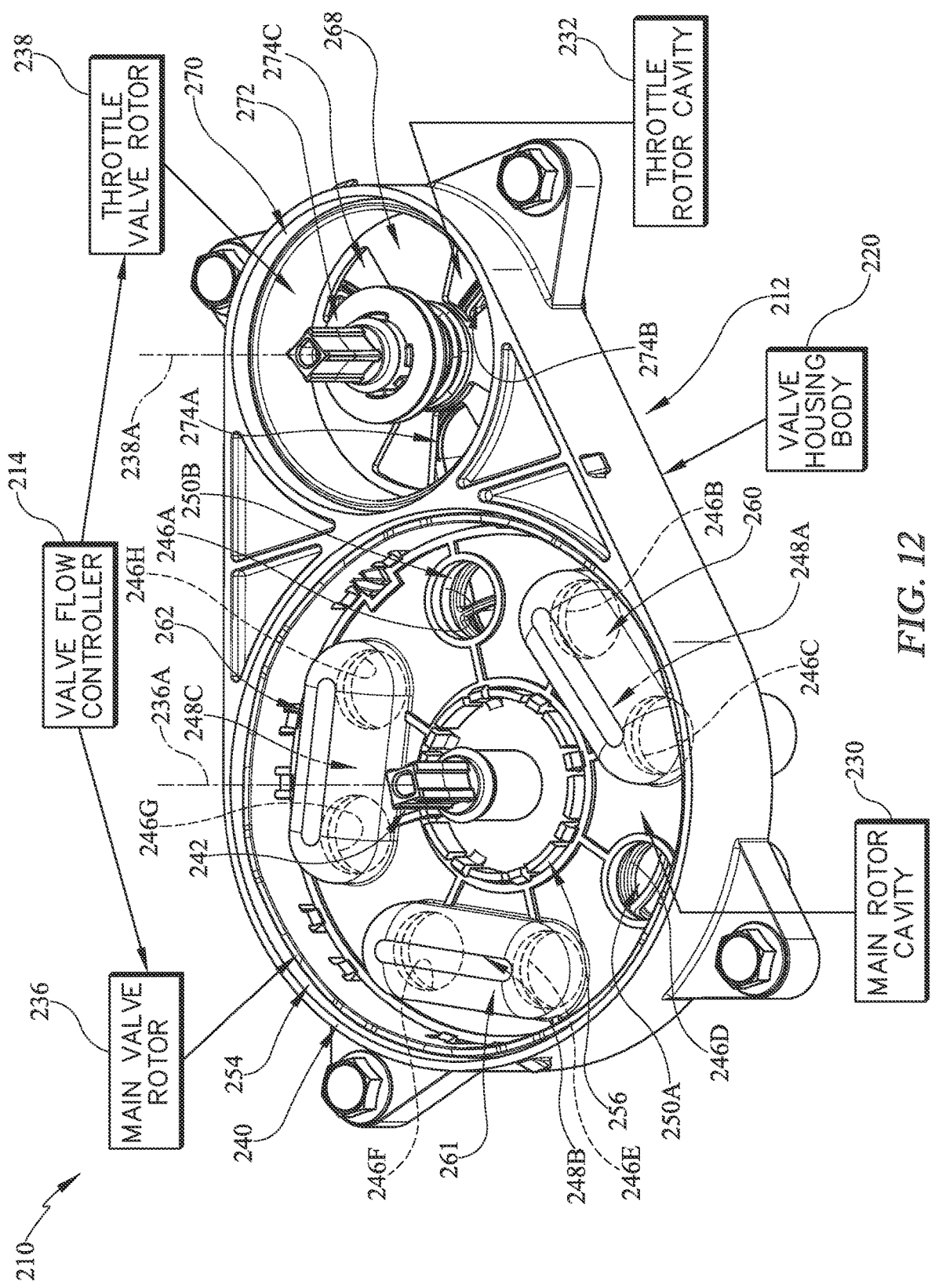
Figure 13:
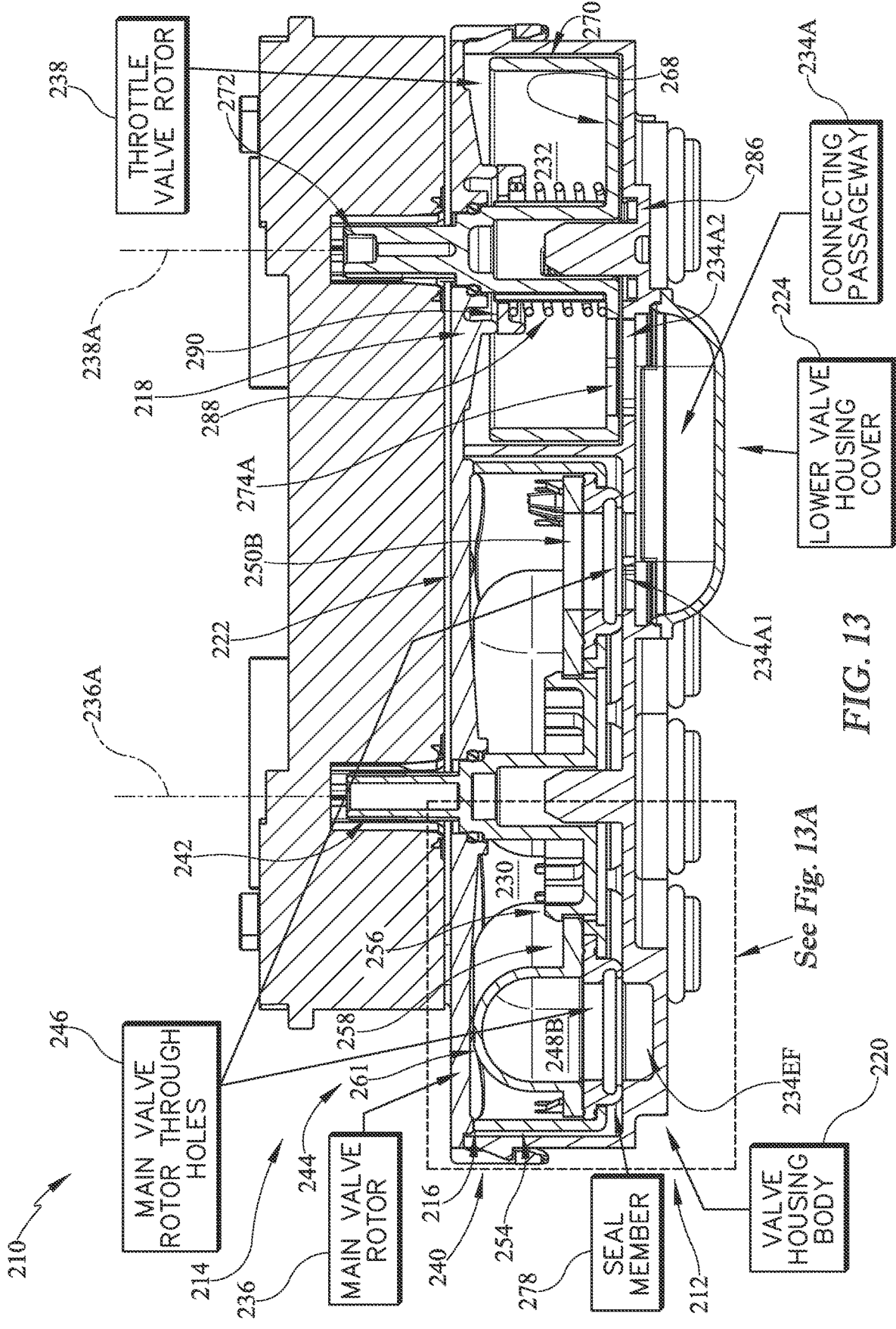
Figure 13A:
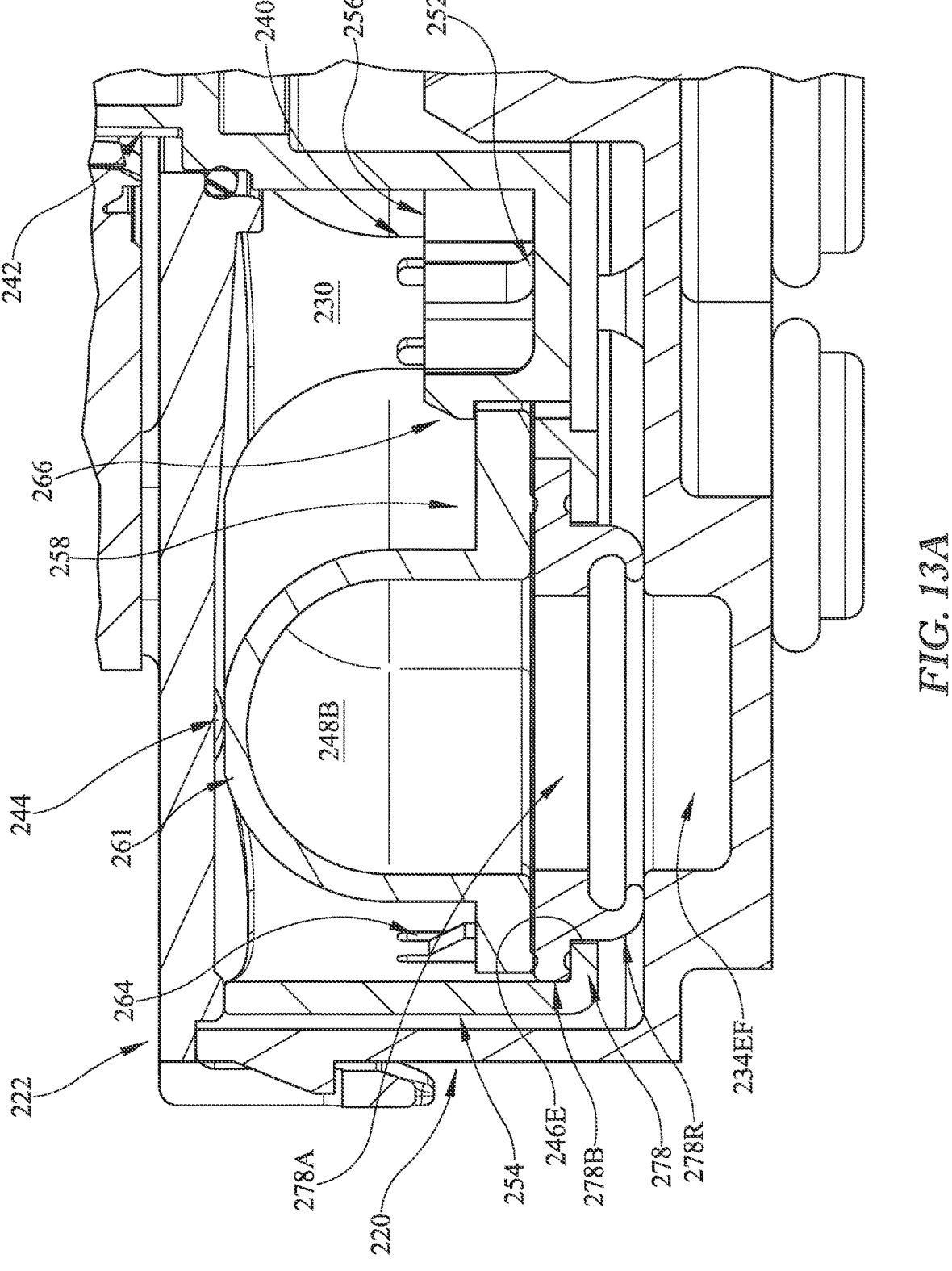

The second biasing assembly 84 includes a bias member 88, a bias member cover 90, and a flange 89 formed on the upper valve housing cover 22 as shown in FIGS. 11-13. The bias member 88 is configured to be assembled over the throttle valve rotor shaft 72. The bias member cover 90 is arranged over the bias member 88 when the bias member 88 extends around the throttle valve rotor shaft 72. The bias member cover 90 is coupled to the throttle valve rotor 38 for rotation therewith. The flange 89 formed on the upper valve housing cover 22 engages the bias member cover 90 when the upper valve housing cover 22 is coupled to the valve housing body 20 to load the second biasing assembly 84 when the throttle valve rotor 38 is arranged in the second valve cavity 32.

With the bias member 88 and the bias member cover 90 assembled on the throttle valve rotor 38, the throttle valve rotor 38 may be arranged in the second valve cavity 32 as shown in FIG. 4. The upper valve housing cover 22 defines the flange 89 that extends axially toward and engages the bias member cover 90 so that the bias member 88 is compressed. This causes the bias member 88 to apply an axial force on the throttle valve rotor 38 thereby urging the throttle valve rotor 38 toward the plurality of apertures 34A2, 34I, 34J formed in the valve housing body 20 when the throttle valve rotor 38 to increase sealing between the throttle valve rotor 38 and the valve housing body 20.

In the illustrative embodiment, the second biasing assembly 84 applies a constant axial force to the throttle valve rotor 38. The second biasing assembly 84 constantly loads the throttle valve rotor 38. In other embodiments, the second biasing assembly 84 may include cam features like the main valve rotor 36 to selectively apply the axial force or reduce the force applied to the throttle valve rotor 38 so that the throttle valve rotor 38 is loaded and unloaded as it rotates between the different predetermined positions.

Figures 7, 8:
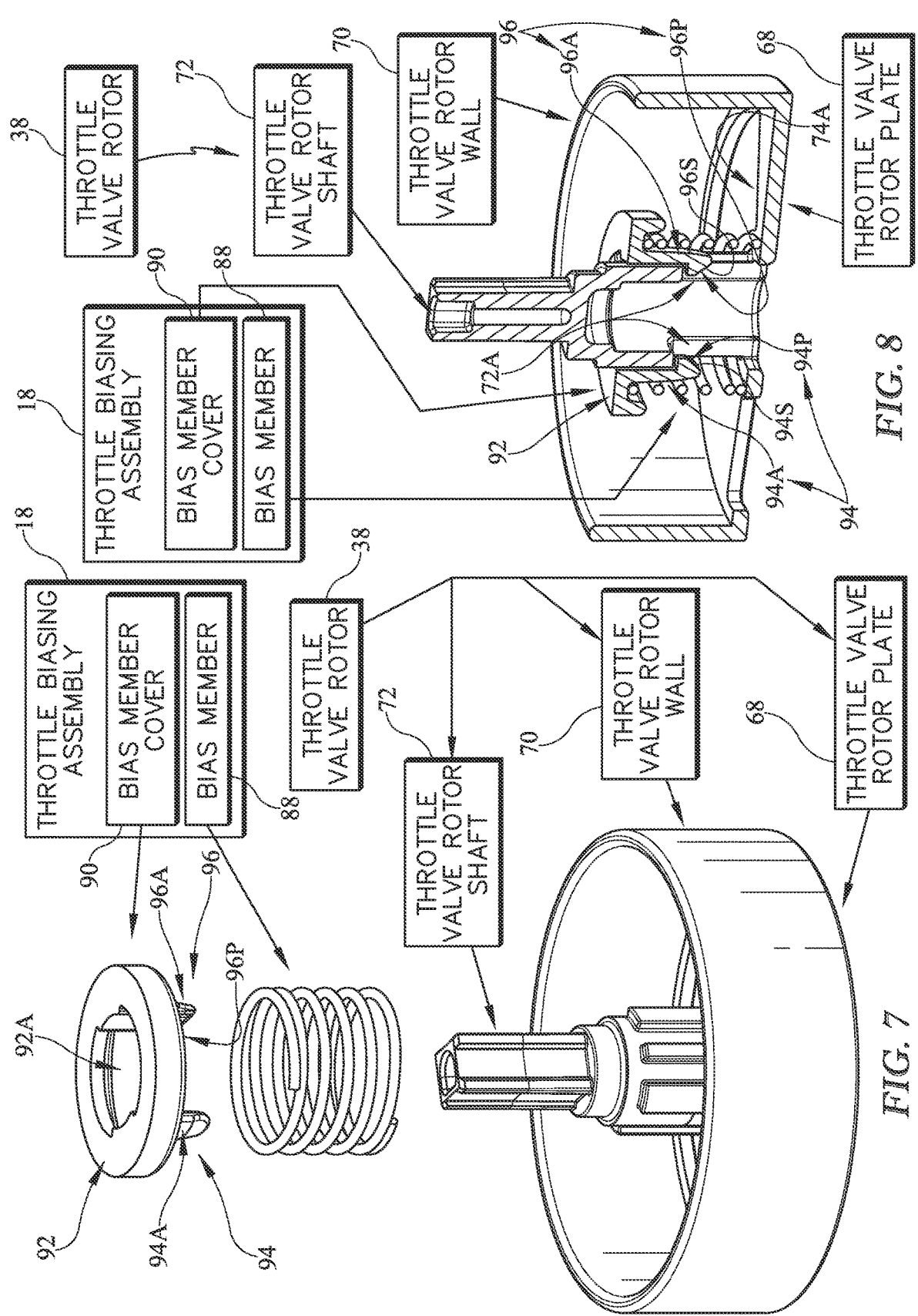
Figure 9:
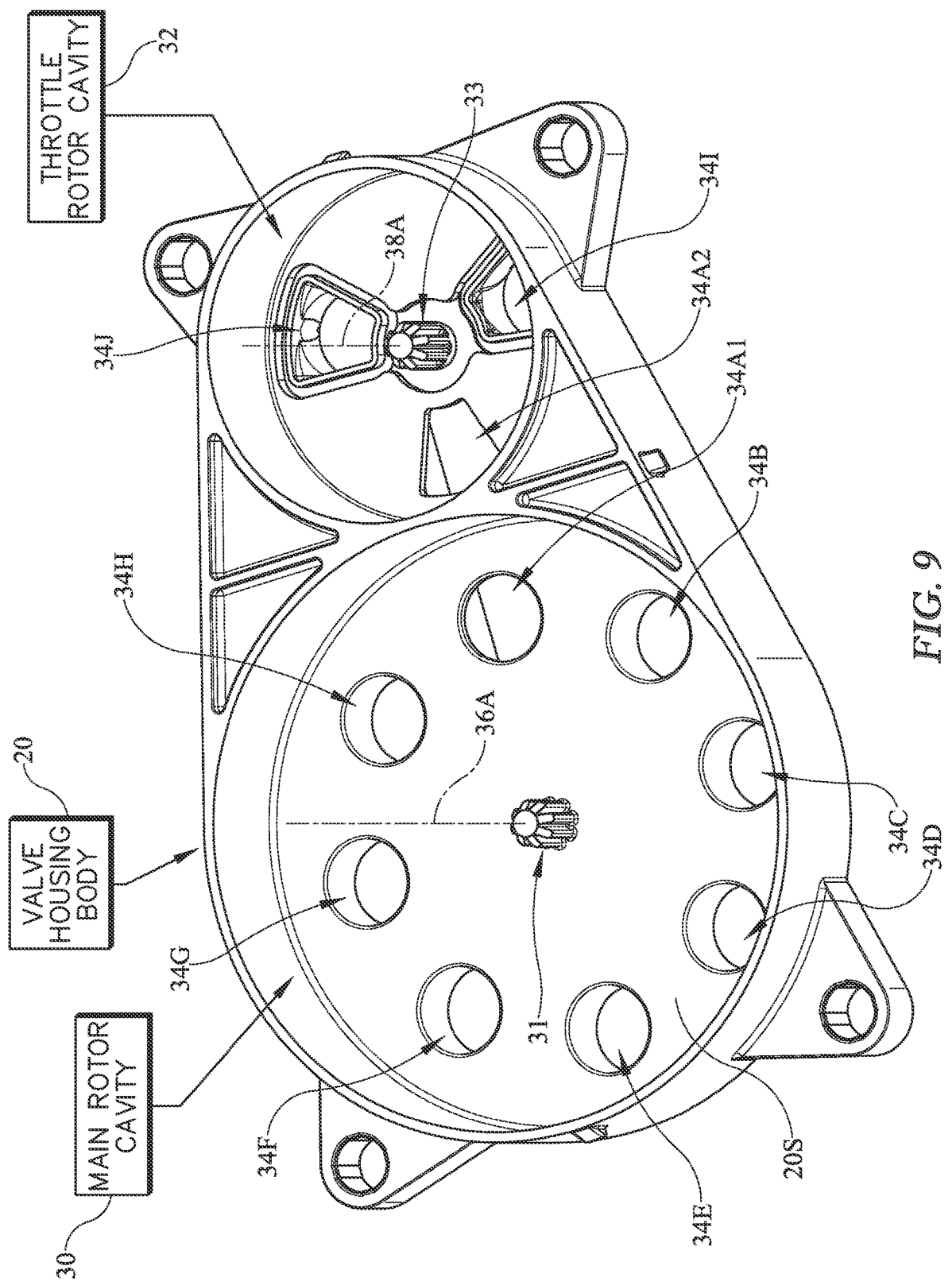

The bias member cover 90 includes a ring 92 and a pair of deflectable attachment tabs 94, 96 as shown in FIGS. 4, 7, and 8. The ring 92 extends circumferentially about the second rotor axis 38A. The throttle valve rotor shaft 72 extends through a hole 92A formed in the ring of the bias member cover 90. The deflectable attachment tabs 94, 96 each extend axially from the ring 92. The deflectable attachment tabs 94, 96 each extend into openings 72A on opposite sides of the throttle valve rotor shaft 72 to couple the bias member cover 90 to the throttle valve rotor 38.

Figure 4B:
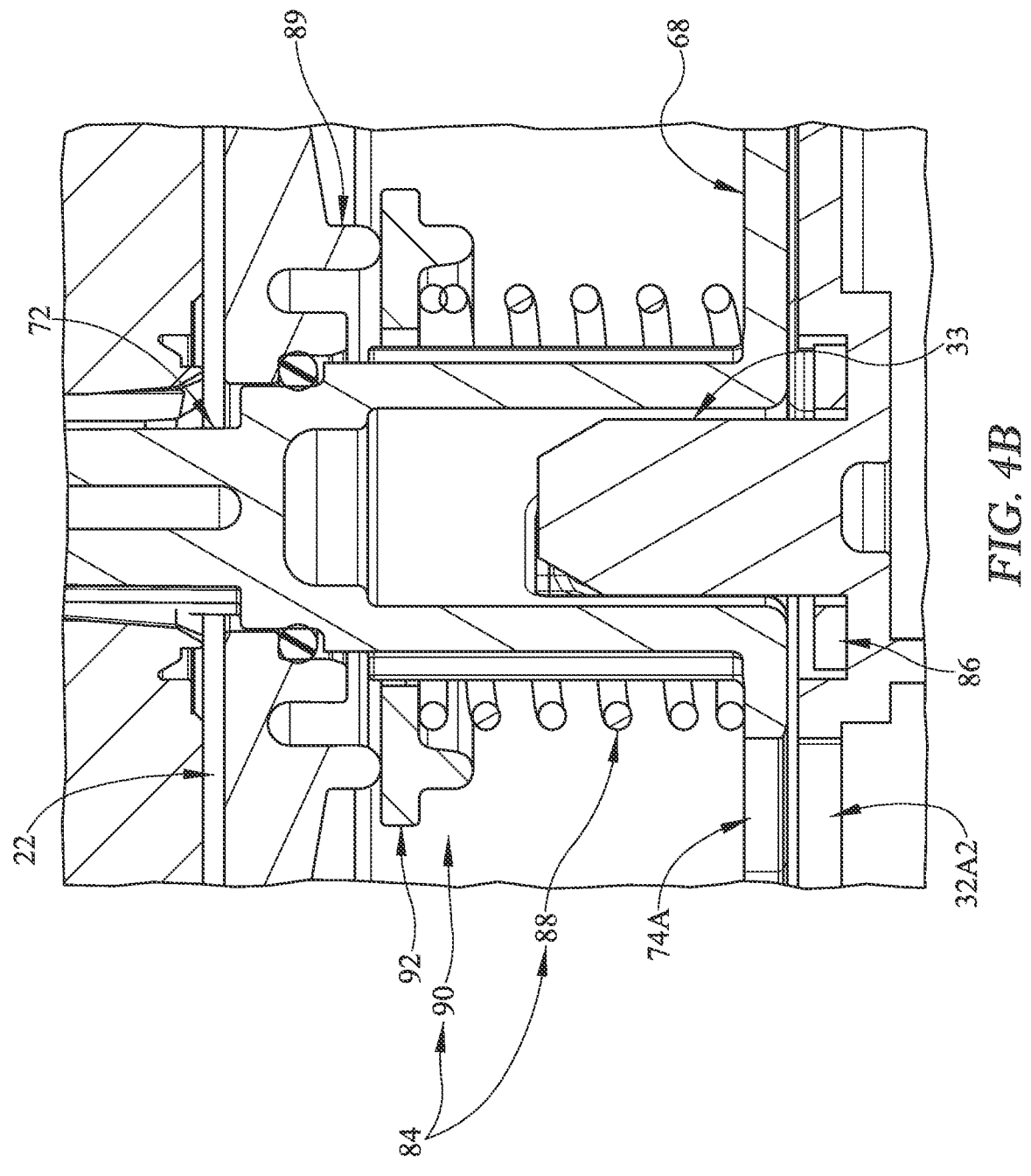

In the illustrative embodiment, the bias member 88 is located axially between the throttle valve rotor plate 68 and the ring 92 of the bias member cover 90 as shown in FIGS. 4, 4B, and 8. The deflectable attachment tabs 94, 96 extend axially from the ring 92 so that the attachment tabs 94, 96 are located radially between the bias member 88 and the throttle valve rotor shaft 72.

Each deflectable attachment tab 94, 96 includes a deflectable attachment arm 94A, 96A and an protrusion 94P, 96P as shown in FIGS. 7 and 8. The deflectable attachment arms 94A, 96A extend axially from the ring 92 on opposite sides of the ring 92. The protrusions 64P, 66P extend radially from the corresponding deflectable lock arm 64A, 66A towards each other.

Each protrusion 94P, 96P defines a guide ramp 94S, 96S that engages the throttle valve rotor shaft 72 as the bias member cover 90 is moved into an engaged position to cause the deflectable attachment arms 94A, 96A to deflect from a normal position to a deflected position so that the bias member cover 90 may be moved into the engaged position on the throttle valve rotor shaft 72. Once the terminal ends of the protrusions 94P. 96P move past an edge of the openings 72A in the throttle valve rotor shaft 72, the deflectable attachment arms 94A, 96A move back to the normal positions so that each of the protrusions 94P, 96P engage the edge of the corresponding openings 72A to block axial movement of the bias member cover 90 of the throttle valve rotor shaft 72.

In the illustrative embodiment, the second seal members 86 is a gasket arranged axially between the valve housing body 20 and the second valve rotor 38 as shown in FIGS. 4 and 4B. The second seal member 86 extends around the apertures 34I, 34J in the illustrative embodiment. In some embodiments, the second seal member 86 extends around the apertures 34A2, 34I, 34J.

In some embodiments, the second seal member 86 may be another suitable seal type. In some embodiments, the second seal member 86 may be a press-fit seal. In some embodiments, the second seal member 86 may be an O-ring seal. In some embodiments, the second seal member 86 may be a plurality of seal members 86 arranged around each aperture 34A2, 34I, 34J.

The different modes of the multi-way valve 10 are shown in FIG. 16. The first mode or mode A is shown in FIG. 16A. The second mode or mode B is shown in FIG. 16B. The third mode or mode C is shown in FIG. 16C. The fourth mode or mode D is shown in FIG. 16D. The fifth mode or mode E is shown in FIG. 16E. The sixth mode or mode F is shown in FIG. 16F. The seventh mode or mode G is shown in FIG. 16G. The eighth mode or mode H is shown in FIG. 16H. The ninth mode or mode I is shown in FIG. 16I. The tenth mode or mode J is shown in FIG. 16J.

In mode A, the main valve rotor 36 is in a MAIN VALVE ROTOR FIRST position and the throttle valve rotor 38 is in a THROTTLE VALVE ROTOR FIRST position as shown in FIG. 16A. In the MAIN VALVE ROTOR FIRST position, the main valve rotor 36 connects the first main-cavity aperture 34A1 to the fourth aperture 34D, connects the second aperture 34B to the third aperture 34C, connects the fifth aperture 34E to the sixth aperture 34F, and connects the seventh aperture 34G to the eighth aperture 34H as shown in FIGS. 16 and 16A-16C. In the THROTTLE VALVE ROTOR FIRST position, the throttle valve rotor 38 connects the first throttle-cavity aperture 34A2 with the first main-cavity aperture 34A1 and the ninth aperture 34I, while blocking flow through the tenth aperture 34J as shown in FIGS. 16 and 16A.

In the MAIN VALVE ROTOR FIRST position, the rotor through hole 46A and the cover through hole 50B are aligned with the first main-cavity aperture 34A1, while the rotor through hole 46D and the cover through hole 50A are aligned with the fourth aperture 34D so as to connect the first main-cavity aperture 34A1 and the fourth aperture 34D in fluid communication as shown in FIGS. 16A-C. In the MAIN VALVE ROTOR FIRST position, the rotor through hole 46B aligns with the second aperture 34B, the rotor through hole 46C aligns with the third aperture 34C, and the first flow divider shell 60 defining the first chamber 48A extends around the second aperture 34B and the third aperture 34C to connect the second aperture 34B and the third aperture 34C in fluid communication as shown in FIGS. 16A-C.

In the MAIN VALVE ROTOR FIRST position, the rotor through hole 46E aligns with the fifth aperture 34E, the rotor through hole 46F aligns with the sixth aperture 34F, and the second flow divider shell 61 defining the second chamber 48B extends around the fifth aperture 34E and the sixth aperture 34F to connect the fifth aperture 34E and the sixth aperture 34F in fluid communication as shown in FIGS. 16A-C. In the MAIN VALVE ROTOR FIRST position, the rotor through hole 46G aligns with the seventh aperture 34G, the rotor through hole 46H aligns with the eighth aperture 34H, and the third flow divider shell 62 defining the third chamber 48C extends around the seventh aperture 34G and the eighth aperture 34H to connect the seventh aperture 34G and the eighth aperture 34H in fluid communication as shown in FIGS. 16A-C.

In the THROTTLE VALVE ROTOR FIRST position, the first through hole 74A in the throttle valve rotor 38 is aligned with the first throttle-cavity aperture 34A2 so that the first valve cavity 30 is in fluid communication with the second valve cavity 32 through the connecting passageway 34A as shown in FIG. 16A. In the THROTTLE VALVE ROTOR FIRST position, the throttle valve rotor 38 also aligns the second through hole 74B with the ninth aperture 34I to connect the first throttle-cavity aperture 34A2 with the ninth aperture 34I and covers the tenth aperture 34J to block flow therethrough as shown in FIG. 16A.

In mode B, the main valve rotor 36 remains in the MAIN VALVE ROTOR FIRST position and the throttle valve rotor 38 is in a THROTTLE VALVE ROTOR SECOND position as shown in FIG. 16B. In the THROTTLE VALVE ROTOR SECOND position, the throttle valve rotor 38 connects the first throttle-cavity aperture 34A2 with the first main-cavity aperture 34A1 and the tenth aperture 34J, while blocking flow through the ninth aperture 34I as shown in FIGS. 16 and 16B.

In the THROTTLE VALVE ROTOR SECOND position, the first through hole 74A in the throttle valve rotor 38 remains aligned with the first throttle-cavity aperture 34A2 so that the first valve cavity 30 is in fluid communication with the second valve cavity 32 through the connecting passageway 34A as shown in FIG. 16B. However, in the THROTTLE VALVE ROTOR SECOND position, the throttle valve rotor 38 aligns the third through hole 74C with the tenth aperture 34J to connect the first throttle-cavity aperture 34A2 with the tenth aperture 34J and covers the ninth aperture 34I to block flow therethrough as shown in FIG. 16B.

In mode C, the main valve rotor 36 remains in the MAIN VALVE ROTOR FIRST position and the throttle valve rotor 38 is in a THROTTLE configuration as shown in FIG. 16C. In the THROTTLE configuration, the first through hole 74A in the throttle valve rotor 38 remains aligned with the first throttle-cavity aperture 34A2 so that the first valve cavity 30 is in fluid communication with the second valve cavity 32 through the connecting passageway 34A as shown in FIG. 16C. However, in the THROTTLE configuration, both through holes 74B, 74C are partially aligned with the respective ninth and tenth apertures 34I, 34J as shown in FIGS. 16 and 16C-16J.

Both through holes 74B, 74C are partially aligned with the respective ninth and tenth apertures 34I, 34J so that the first throttle-cavity aperture 34A2 is in fluid communication with the ninth and tenth apertures 34I, 34J. In the THROTTLE configuration, the throttle valve rotor 38 can rotate about the second rotor axis 38A to vary, or throttle, the flow through the ninth and tenth apertures 34I, 34J. The first through hole 74A extends circumferentially partway about the second rotor axis 38A so that as the throttle valve rotor 38 toggles in the THROTTLE configuration, the first through hole 74A in the throttle valve rotor 38 remains aligned with the first throttle-cavity aperture 34A2. As the throttle valve rotor 38 rotates, the corresponding through holes 74B, 74C vary the flow through the ninth and tenth apertures 34I, 34J.

In any of the modes D-J, the throttle valve rotor 38 may be in the THROTTLE configuration like as shown in FIGS. 16D-J. In the THROTTLE configuration, neither aperture 34I, 34J is blocked as shown in FIG. 16, but the flow through either aperture 34I, 34J may be varied. Alternatively, the throttle valve rotor 38 may be in the THROTTLE VALVE ROTOR FIRST position or the THROTTLE VALVE ROTOR SECOND position in any of the modes D-J.

If the throttle valve rotor 38 is in the THROTTLE VALVE ROTOR FIRST position in any of the modes D-J, then the ninth aperture 34I would be blocked like in FIG. 16A. If the throttle valve rotor 38 is in the THROTTLE VALVE ROTOR SECOND position in any of the modes D-J, then the tenth aperture 34J would be blocked like in FIG. 16B In mode D, the main valve rotor 36 has moved to a MAIN VALVE ROTOR SECOND position as shown in FIG. 16D. In the MAIN VALVE ROTOR SECOND position, the main valve rotor 36 connects the first main-cavity aperture 34A1 to the eighth aperture 34H, connects the second aperture 34B to the fifth aperture 34E, connects the third aperture 34C to the fourth aperture 34D, and connects the sixth aperture 34F to the seventh aperture 34G as shown in FIGS. 16 and 16D.

In the MAIN VALVE ROTOR SECOND position, the rotor through hole 46A and the cover through hole 50B are aligned with the second aperture 34B, while the rotor through hole 46D and the cover through hole 50A are aligned with the fifth aperture 34E so as to connect the second aperture 34B and the fifth aperture 34E in fluid communication as shown in FIG. 16D. In the MAIN VALVE ROTOR SECOND position, the rotor through hole 46B aligns with the third aperture 34C, the rotor through hole 46C aligns with the fourth aperture 34D, and the first flow divider shell 60 defining the first chamber 48A extends around the third aperture 34C and the fourth aperture 34D to connect the third aperture 34C and the fourth aperture 34D in fluid communication as shown in FIG. 16D.

In the MAIN VALVE ROTOR SECOND position, the rotor through hole 46E aligns with the sixth aperture 34F, the rotor through hole 46F aligns with the seventh aperture 34G, and the second flow divider shell 61 defining the second chamber 48B extends around the sixth aperture 34F and the seventh aperture 34G to connect the sixth aperture 34F and the seventh aperture 34G in fluid communication as shown in FIG. 16D. In the MAIN VALVE ROTOR SECOND position, the rotor through hole 46G aligns with the eighth aperture 34H, the rotor through hole 46H aligns with the first main-cavity aperture 34A1, and the third flow divider shell 62 defining the third chamber 48C extends around the eighth aperture 34H and the first main-cavity aperture 34A1 to connect the eighth aperture 34H and the first main-cavity aperture 34A1 in fluid communication as shown in FIG. 16D.

In some embodiments, the valve housing body 20 may be formed to include a channel 34EF' instead of two separate apertures 34E, 34F as suggested in FIG. 16D. The channel 34EF' interconnects more than just adjacent rotor through holes 46A-H when the main valve rotor 36 is in the different predetermined positions as suggested in FIGS. 16D, 16E, 16G, 16H, and 16J.

For example, in the MAIN VALVE ROTOR SECOND position, if the valve housing 20 includes the channel 34EF' instead of two separate apertures 34E, 34F, the rotor through hole 46F aligns with the seventh aperture 34G and the rotor through hole 46E may align with one end of the channel 34EF' so that the seventh aperture 34G may be in fluid communication with the channel 34EF' through the second chamber 48B as suggested in FIG. 16D. The rotor through hole 46D, aligned with the cover through hole 50A, may align with the other end of the channel 34EF' so that seventh aperture 34G may be be in fluid communication with the first valve cavity 30 as suggested in FIG. 16D. Therefore, the channel 34EF' may interconnect the seventh aperture 34G to the second aperture 34B when the main valve rotor 36 is in the MAIN VALVE ROTOR SECOND position, whereas only the sixth aperture 34F is connected to the seventh aperture 34G when using single apertures 34E, 34F.

In mode D, the throttle valve rotor 38 may remain in the THROTTLE configuration as shown in FIGS. 16 and 16D. Alternatively, the throttle valve rotor 38 may rotate to any one of the positions to control the fluid communication between the eighth aperture 34H and the ninth and tenth apertures 34I, 34J through the connecting passageway 34A as suggested in FIG. 16.

In mode E, the main valve rotor 36 has moved to a MAIN VALVE ROTOR THIRD position as shown in FIG. 16E. In the MAIN VALVE ROTOR THIRD position, the main valve rotor 36 connects the first main-cavity aperture 34A1 to the second aperture 34B, connects the third aperture 34C to the sixth aperture 34F, connects the fourth aperture 34D to the fifth aperture 34E, and connects the seventh aperture 34G to the eighth aperture 34H as shown in FIGS. 16 and 16E

In the MAIN VALVE ROTOR THIRD position, the rotor through hole 46A and the cover through hole 50B are aligned with the third aperture 34C, while the rotor through hole 46D and the cover through hole 50A are aligned with the sixth aperture 34F so as to connect the third aperture 34C and the sixth aperture 34F in fluid communication as shown in FIG. 16E. In the MAIN VALVE ROTOR THIRD position, the rotor through hole 46B aligns with the fourth aperture 34D, the rotor through hole 46C aligns with the fifth aperture 34E, and the first flow divider shell 60 defining the first chamber 48A extends around the fourth aperture 34D and the fifth aperture 34E to connect the fourth aperture 34D and the fifth aperture 34E in fluid communication as shown in FIG. 16E.

In the MAIN VALVE ROTOR THIRD position, the rotor through hole 46E aligns with the seventh aperture 34G, the rotor through hole 46F aligns with the eighth aperture 34H, and the second flow divider shell 61 defining the second chamber 48B extends around the seventh aperture 34G and the eighth aperture 34H to connect the seventh aperture 34G and the eighth aperture 34H in fluid communication as shown in FIG. 16E. In the MAIN VALVE ROTOR THIRD position, the rotor through hole 46G aligns with the first main-cavity aperture 34A1, the rotor through hole 46H aligns with the second aperture 34B, and the third flow divider shell 62 defining the third chamber 48C extends around the first main-cavity aperture 34A1 and the second aperture 34B to connect the first main-cavity aperture 34A1 and the second aperture 34B in fluid communication as shown in FIG. 16E.

Like in FIG. 16D, the valve housing body 20 may be formed to include the channel 34EF' instead of two separate apertures 34E, 34F as suggested in FIG. 16E. In the MAIN VALVE ROTOR THIRD position, if the valve housing 20 includes the channel 34EF' instead of two separate apertures 34E, 34F, the rotor through hole 46B aligns with the fourth aperture 34D and the rotor through hole 46C may align with one end of the channel 34EF' so that the fourth aperture 34D may be in fluid communication with the channel 34EF' through the first chamber 48A as suggested in FIG. 16E. The rotor through hole 46D, aligned with the cover through hole 50A may align with the other end of the channel 34EF' so that fourth aperture 34D may be in fluid communication with the first valve cavity 30 as suggested in FIG. 16E. Therefore, the channel 34EF' may interconnect the fourth aperture 34D to the third aperture 34C when the main valve rotor 36 is in the MAIN VALVE ROTOR THIRD position, whereas only the fourth aperture 34D is connected to the fifth aperture 34E using single apertures 34E, 34F.

In mode E, the throttle valve rotor 38 may remain in the THROTTLE configuration as shown in FIG. 16E. Alternatively, the throttle valve rotor 38 may rotate to any one of the positions to control the fluid communication between the second aperture 34B and the ninth and tenth apertures 34I, 34J through the connecting passageway 34A as suggested in FIG. 16.

In mode F, the main valve rotor 36 has moved to a MAIN VALVE ROTOR FOURTH position as shown in FIG. 16F. In the MAIN VALVE ROTOR FOURTH position, the main valve rotor 36 connects the first main-cavity aperture 34A1 to the eighth aperture 34H, connects the second aperture 34B to the third aperture 34C, connects the fourth aperture 34D to the seventh aperture 34G, and connects the fifth aperture 34E to the sixth aperture 34F as shown in FIGS. 16 and 16F.

In the MAIN VALVE ROTOR FOURTH position, the rotor through hole 46A and the cover through hole 50B are aligned with the fourth aperture 34D, while the rotor through hole 46D and the cover through hole 50A are aligned with the seventh aperture 34G so as to connect the fourth aperture 34D and the seventh aperture 34G in fluid communication as shown in FIG. 16F. In the MAIN VALVE ROTOR FOURTH position, the rotor through hole 46B aligns with the fifth aperture 34E, the rotor through hole 46C aligns with the sixth aperture 34F, and the first flow divider shell 60 defining the first chamber 48A extends around the fifth aperture 34E and the sixth aperture 34F to connect the fifth aperture 34E and the sixth aperture 34F in fluid communication as shown in FIG. 16F.

In the MAIN VALVE ROTOR FOURTH position, the rotor through hole 46E aligns with the eighth aperture 34H, the rotor through hole 46F aligns with the first main-cavity aperture 34A1, and the second flow divider shell 61 defining the second chamber 48B extends around the eighth aperture 34H and the first main-cavity aperture 34A1 to connect the eighth aperture 34H and the first main-cavity aperture 34A1 in fluid communication as shown in FIG. 16F. In the MAIN VALVE ROTOR FOURTH position, the rotor through hole 46G aligns with the second aperture 34B, the rotor through hole 46H aligns with the third aperture 34C, and the third flow divider shell 62 defining the third chamber 48C extends around the second aperture 34B and the third aperture 34C to connect the second aperture 34B and the third aperture 34C in fluid communication as shown in FIG. 16F.

In some embodiments, if the valve housing body 20 is formed to include the channel 34EF', the rotor through hole 46B may align with one end of the channel 34EF' and the rotor through hole 46C may align with the other end when the main valve rotor 36 is in the MAIN VALVE ROTOR FOURTH position so that the first flow divider shell 60 extends around the channel 34EF' and blocks fluid flow to/from the channel 34EF' as suggested in FIG. 16F. The first flow divider shell 60 may create a closed loop with the channel 34EF'.

In mode F, the throttle valve rotor 38 may remain in the THROTTLE configuration as shown in FIG. 16F. Alternatively, the throttle valve rotor 38 may rotate to any one of the positions to control the fluid communication between the eighth aperture 34H and the ninth and tenth apertures 34I, 34J through the connecting passageway 34A as suggested in FIG. 16.

In mode G, the main valve rotor 36 has moved to a MAIN VALVE ROTOR FIFTH position as shown in FIG. 16G. In the MAIN VALVE ROTOR FIFTH position, the main valve rotor 36 connects the first main-cavity aperture 34A1 to the second aperture 34B, connects the third aperture 34C to the fourth aperture 34D, connects the fifth aperture 34E to the eighth aperture 34H, and connects the sixth aperture 34F to the seventh aperture 34G as shown in FIGS. 16 and 16G.

In the MAIN VALVE ROTOR FIFTH position, the rotor through hole 46A and the cover through hole 50B are aligned with the fifth aperture 34E, while the rotor through hole 46D and the cover through hole 50A are aligned with the eighth aperture 34H so as to connect the fifth aperture 34E and the eighth aperture 34H in fluid communication as shown in FIG. 16G. In the MAIN VALVE ROTOR FIFTH position, the rotor through hole 46B aligns with the sixth aperture 34F, the rotor through hole 46C aligns with the seventh aperture 34G, and the first flow divider shell 60 defining the first chamber 48A extends around the sixth aperture 34F and the seventh aperture 34G to connect the sixth aperture 34F and the seventh aperture 34G in fluid communication as shown in FIG. 16G.

In the MAIN VALVE ROTOR FIFTH position, the rotor through hole 46E aligns with the first main-cavity aperture 34A1, the rotor through hole 46F aligns with the second aperture 34B, and the second flow divider shell 61 defining the second chamber 48B extends around the first main-cavity aperture 34A1 and the second aperture 34B to connect the first main-cavity aperture 34A1 and the second aperture 34B in fluid communication as shown in FIG. 16G. In the MAIN VALVE ROTOR FIFTH position, the rotor through hole 46G aligns with the third aperture 34C, the rotor through hole 46H aligns with the fourth aperture 34D, and the third flow divider shell 62 defining the third chamber 48C extends around the third aperture 34C and the fourth aperture 34D to connect the third aperture 34C and the fourth aperture 34D in fluid communication as shown in FIG. 16G.

Like in the MAIN VALVE ROTOR SECOND position, if the valve housing 20 includes the channel 34EF' instead of two separate apertures 34E, 34F, the rotor through hole 46C aligns with the seventh aperture 34G and the rotor through hole 46B may align with one end of the channel 34EF' so that the seventh aperture 34G may be in fluid communication with the channel 34EF' through the first chamber 48A when the main valve rotor 36 is in the MAIN VALVE ROTOR FIFTH position as suggested in FIG. 16G. The rotor through hole 46A, aligned with the cover through hole 50B, may align with the other end of the channel 34EF' so that seventh aperture 34G may be in fluid communication with the first valve cavity 30. However, in the MAIN VALVE ROTOR FIFTH position, the channel 34EF' may interconnect the seventh aperture 34G to the eighth aperture 34H as suggested in FIG. 16G.

In mode G, the throttle valve rotor 38 may remain in the THROTTLE configuration as shown in FIG. 16G. Alternatively, the throttle valve rotor 38 may rotate to any one of the positions to control the fluid communication between the second aperture 34B and the ninth and tenth apertures 34I, 34J through the connecting passageway 34A as suggested in FIG. 16.

In mode H, the main valve rotor 36 has moved to a MAIN VALVE ROTOR SIXTH position as shown in FIG. 16H. In the MAIN VALVE ROTOR SIXTH position, the main valve rotor 36 connects the first main-cavity aperture 34A1 to the sixth aperture 34F, connects the second aperture 34B to the third aperture 34C, connects the fourth aperture 34D to the fifth aperture 34E, and connects the seventh aperture 34G to the eighth aperture 34H as shown in FIGS. 16 and 16H.

In the MAIN VALVE ROTOR SIXTH position, the rotor through hole 46A and the cover through hole 50B are aligned with the sixth aperture 34F, while the rotor through hole 46D and the cover through hole 50A are aligned with the first main-cavity aperture 34A1 so as to connect the sixth aperture 34F and the first main-cavity aperture 34A1 in fluid communication as shown in FIG. 16H. In the MAIN VALVE ROTOR SIXTH position, the rotor through hole 46B aligns with the seventh aperture 34G, the rotor through hole 46C aligns with the eighth aperture 34H, and the first flow divider shell 60 defining the first chamber 48A extends around the seventh aperture 34G and the eighth aperture 34H to connect the seventh aperture 34G and the eighth aperture 34H in fluid communication as shown in FIG. 16H.

In the MAIN VALVE ROTOR SIXTH position, the rotor through hole 46E aligns with the second aperture 34B, the rotor through hole 46F aligns with the third aperture 34C, and the second flow divider shell 61 defining the second chamber 48B extends around the second aperture 34B and the third aperture 34C to connect the second aperture 34B and the third aperture 34C in fluid communication as shown in FIG. 16H. In the MAIN VALVE ROTOR SIXTH position, the rotor through hole 46G aligns with the fourth aperture 34D, the rotor through hole 46H aligns with the fifth aperture 34E, and the third flow divider shell 62 defining the third chamber 48C extends around the fourth aperture 34D and the fifth aperture 34E to connect the fourth aperture 34D and the fifth aperture 34E in fluid communication as shown in FIG. 16H.

Like in the MAIN VALVE ROTOR THIRD position, if the valve housing 20 includes the channel 34EF' instead of two separate apertures 34E, 34F, the rotor through hole 46G aligns with the fourth aperture 34D and the rotor through hole 46H may align with one end of the channel 34EF' so that the fourth aperture 34D may be in fluid communication with the channel 34EF' through the third chamber 48C as suggested in FIG. 16H. The rotor through hole 46A, aligned with the cover through hole 50B, may align with the other end of the channel 34EF' so that fourth aperture 34D may be in fluid communication with the first valve cavity 30. However, in the MAIN VALVE ROTOR SIXTH position, the channel 34EF' may interconnect the fourth aperture 34D to the first main-cavity aperture 34A1 as suggested in FIG. 16H.

In mode H, the throttle valve rotor 38 may remain in the THROTTLE configuration as shown in FIG. 16H. Alternatively, the throttle valve rotor 38 may rotate to any one of the positions to control the fluid communication between the sixth aperture 34F and the ninth and tenth apertures 34I, 34J through the connecting passageway 34A as suggested in FIG. 16.

In mode I, the main valve rotor 36 has moved to a MAIN VALVE ROTOR SEVENTH position as shown in FIG. 16I. In the MAIN VALVE ROTOR SEVENTH position, the main valve rotor 36 connects the first main-cavity aperture 34A1 to the eighth aperture 34H, connects the second aperture 34B to the seventh aperture 34G, connects the third aperture 34C to the fourth aperture 34D, and connects the fifth aperture 34E to the sixth aperture 34F as shown in FIGS. 16 and 16I.

In the MAIN VALVE ROTOR SEVENTH position, the rotor through hole 46A and the cover through hole 50B are aligned with the seventh aperture 34G, while the rotor through hole 46D and the cover through hole 50A are aligned with the second aperture 34B so as to connect the seventh aperture 34G and the second aperture 34B in fluid communication as shown in FIG. 16I. In the MAIN VALVE ROTOR SEVENTH position, the rotor through hole 46B aligns with the eighth aperture 34H, the rotor through hole 46C aligns with the first main-cavity aperture 34A1, and the first flow divider shell 60 defining the first chamber 48A extends around the eighth aperture 34H and the first main-cavity aperture 34A1 to connect the eighth aperture 34H and the first main-cavity aperture 34A1 in fluid communication as shown in FIG. 16I.

In the MAIN VALVE ROTOR SEVENTH position, the rotor through hole 46E aligns with the third aperture 34C, the rotor through hole 46F aligns with the fourth aperture 34D, and the second flow divider shell 61 defining the second chamber 48B extends around the third aperture 34C and the fourth aperture 34D to connect the third aperture 34C and the fourth aperture 34D in fluid communication as shown in FIG. 16I. In the MAIN VALVE ROTOR SEVENTH position, the rotor through hole 46G aligns with the fifth aperture 34E, the rotor through hole 46H aligns with the sixth aperture 34F, and the third flow divider shell 62 defining the third chamber 48C extends around the fourth aperture 34D and the fifth aperture 34E to connect the fifth aperture 34E and the sixth aperture 34F in fluid communication as shown in FIG. 16I.

In mode I, the throttle valve rotor 38 may remain in the THROTTLE configuration as shown in FIG. 16I. Alternatively, the throttle valve rotor 38 may rotate to any one of the positions to control the fluid communication between the eighth aperture 34H and the ninth and tenth apertures 34I, 34J through the connecting passageway 34 as suggested in FIG. 16.

In mode J, the main valve rotor 36 has moved to a MAIN VALVE ROTOR EIGHTH position as shown in FIG. 16J. In the MAIN VALVE ROTOR EIGHTH position, the main valve rotor 36 connects the first main-cavity aperture 34A1 to the second aperture 34B, connects the third aperture 34C to the eighth aperture 34H, connects the fourth aperture 34D to the fifth aperture 34E, and connects the sixth aperture 34F to the seventh aperture 34G as shown in FIGS. 16 and 16J.

In the MAIN VALVE ROTOR EIGHTH position, the rotor through hole 46A and the cover through hole 50B are aligned with the eighth aperture 34H, while the rotor through hole 46D and the cover through hole 50A are aligned with the third aperture 34C so as to connect the eighth aperture 34H and the third aperture 34C in fluid communication as shown in FIG. 16J. In the MAIN VALVE ROTOR EIGHTH position, the rotor through hole 46B aligns with the first main-cavity aperture 34A1, the rotor through hole 46C aligns with the second aperture 34B, and the first flow divider shell 60 defining the first chamber 48A extends around the first main-cavity aperture 34A1 and the second aperture 34B to connect the first main-cavity aperture 34A1 and the second aperture 34B in fluid communication as shown in FIG. 16J.

In the MAIN VALVE ROTOR EIGHTH position, the rotor through hole 46E aligns with the fourth aperture 34D, the rotor through hole 46F aligns with the fifth aperture 34E, and the second flow divider shell 61 defining the second chamber 48B extends around the fourth aperture 34D and the fifth aperture 34E to connect the fourth aperture 34D and the fifth aperture 34E in fluid communication as shown in FIG. 16J. In the MAIN VALVE ROTOR EIGHTH position, the rotor through hole 46G aligns with the sixth aperture 34F, the rotor through hole 46H aligns with the seventh aperture 34G, and the third flow divider shell 62 defining the third chamber 48C extends around the sixth aperture 34F and the seventh aperture 34G to connect the sixth aperture 34F and the seventh aperture 34G in fluid communication as shown in FIG. 16J.

In some embodiments, where the valve housing body 20 is formed to include the channel 34EF' instead of two single apertures 34E, 34F, the channel 34EF' may interconnect the fourth aperture 34D and the seventh aperture 34G when the main valve rotor 36 is in the MAIN VALVE ROTOR EIGHTH position as suggested in FIG. 16J. The rotor through hole 46G may align with one end of the channel 34EF', while the rotor through hole 46F may align with the other end to interconnect the fourth aperture 34D and the seventh aperture 34G as suggested in FIG. 16J.

In mode J, the throttle valve rotor 38 may remain in the THROTTLE configuration as shown in FIG. 16J. Alternatively, the throttle valve rotor 38 may rotate to any one of the positions to control the fluid communication between the second aperture 34B and the ninth and tenth apertures 34I, 34J through the connecting passageway 34A as suggested in FIG. 16.

The multi-way valve 10 and/or the actuator 26 may include the control unit configured to direct the actuator 26 to move each of the valve rotors 36, 38 to the different predetermined positions in each of the different modes A-J. Based on where the vehicle needs fluid, the control unit would direct the actuator 26 to move each of the valve rotors 36, 38 to one of the positions for the desired mode. In the illustrative embodiment, a single dual actuator 26 is used. In other embodiments, separate actuators 26 for each valve rotor 36, 38 may be used. The multiple actuators 26 may be coupled to the control unit to independently direct each actuator 26 to move each of the valve rotors 36, 38 to the different predetermined positions in each of the different modes A-J.

Another embodiment of a multi-way valve 210 in accordance with the present disclosure is shown in FIGS. 10-15. The multi-way valve 210 is substantially similar to the multi-way valve 10 shown in FIGS. 1-9 and described herein. Accordingly, similar reference numbers in the 200 series indicate features that are common between the multi-way valve 10 and the multi-way valve 210. The description of the multi-way valve 10 is incorporated by reference to apply to the multi-way valve 210, except in instances when it conflicts with the specific description and the drawings of the multi-way valve 210.

The multi-way valve 210 includes a valve housing 212, a valve flow controller 214, and first and second sealing systems 216, 218 as shown in FIGS. 10-15. The valve flow controller 214 is arranged in the valve housing 212 to control flow through the valve housing 212. The valve flow controller 214 includes first and second valve rotors 236, 238. The first sealing system 216 is configured to seal between the valve housing 212 the main valve rotor 236, while the second sealing system 218 is configured to seal between the valve housing 212 and the throttle valve rotor 238.

The different modes of the multi-way valve 210 are similar to, if not the same as, the modes of the multi-way valve 10 as shown in FIG. 16. The multi-way valve 210 changes between modes A-J so that the first valve rotor 236 and the second valve rotor 238 are in one of the different predetermined positions to form different flow paths through the valve housing 212.

Figure 14:
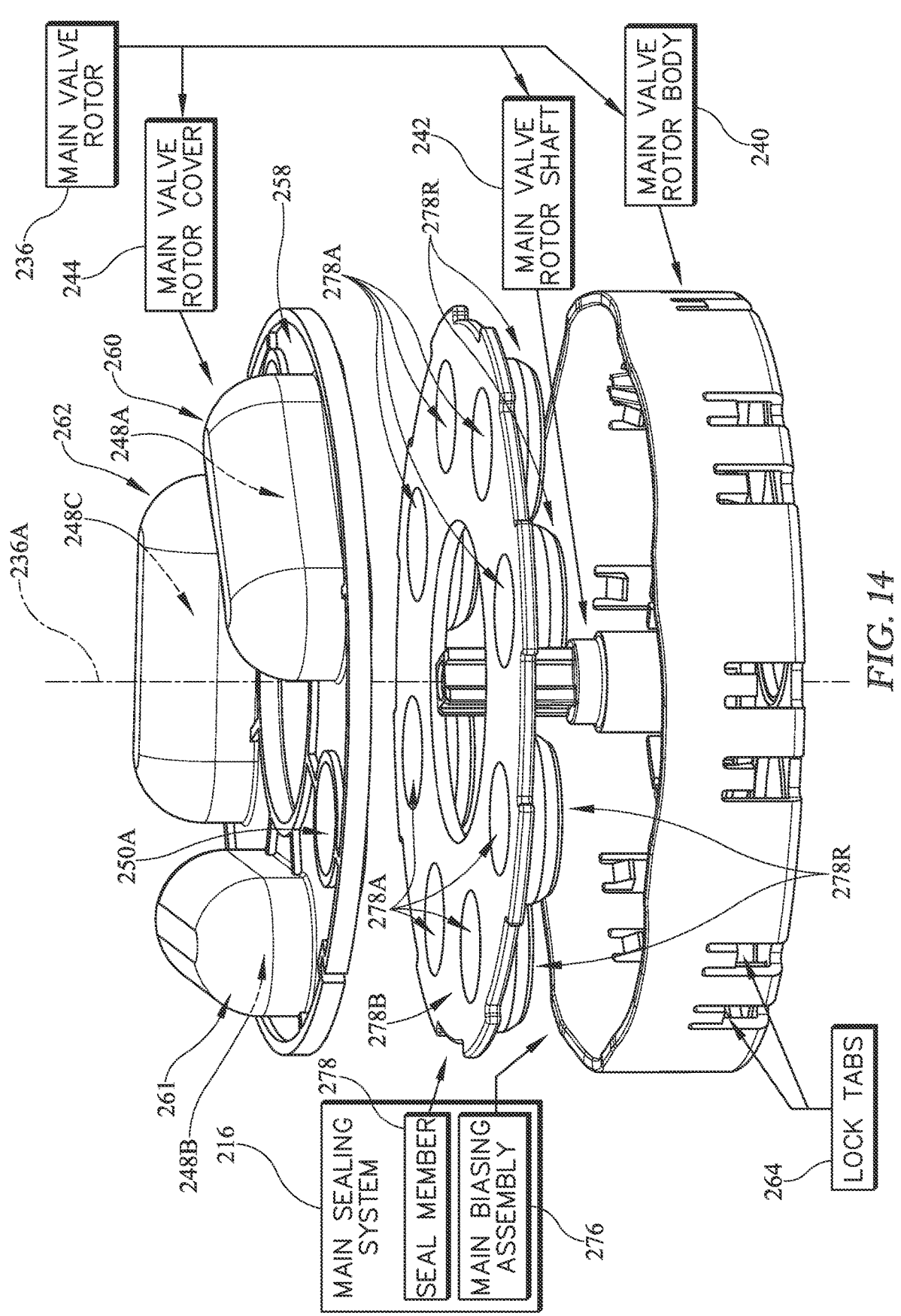

Unlike the first sealing system 16 in the embodiment of the multi-way valve 10 in FIGS. 1-9, the first sealing system 216 includes a single seal member 278 as shown in FIGS. 11 and 14. The single seal member 278 is coupled with the main valve rotor 236 for rotation therewith. The single seal member 278 includes a seal base 278B and a plurality of seal ribs 278R that extend axially from the seal base 278B to extend into a corresponding through hole 246 in the main valve rotor 236. The first seal member 278 is formed to define a plurality of openings 278A that each extend through the seal base 278B and one of the seal ribs 278R so that the flow of fluid may flow through the first seal member 278.

The valve housing includes a valve housing body 220, an upper valve housing cover 222, and a lower valve housing cover 224 as shown in FIGS. 11-15. The valve housing body 220 is coupled to a manifold of the thermal fluid circuits. The upper valve housing cover 222 is coupled to the valve housing body 220 to close top openings of the first and second valve cavities 230, 232. The lower valve housing cover 224 is coupled to the valve housing body 220 opposite the upper valve housing cover 222 to close off a bottom opening to form the connecting passageway 234A between the first and second valve cavities 230, 232.

Figure 15:
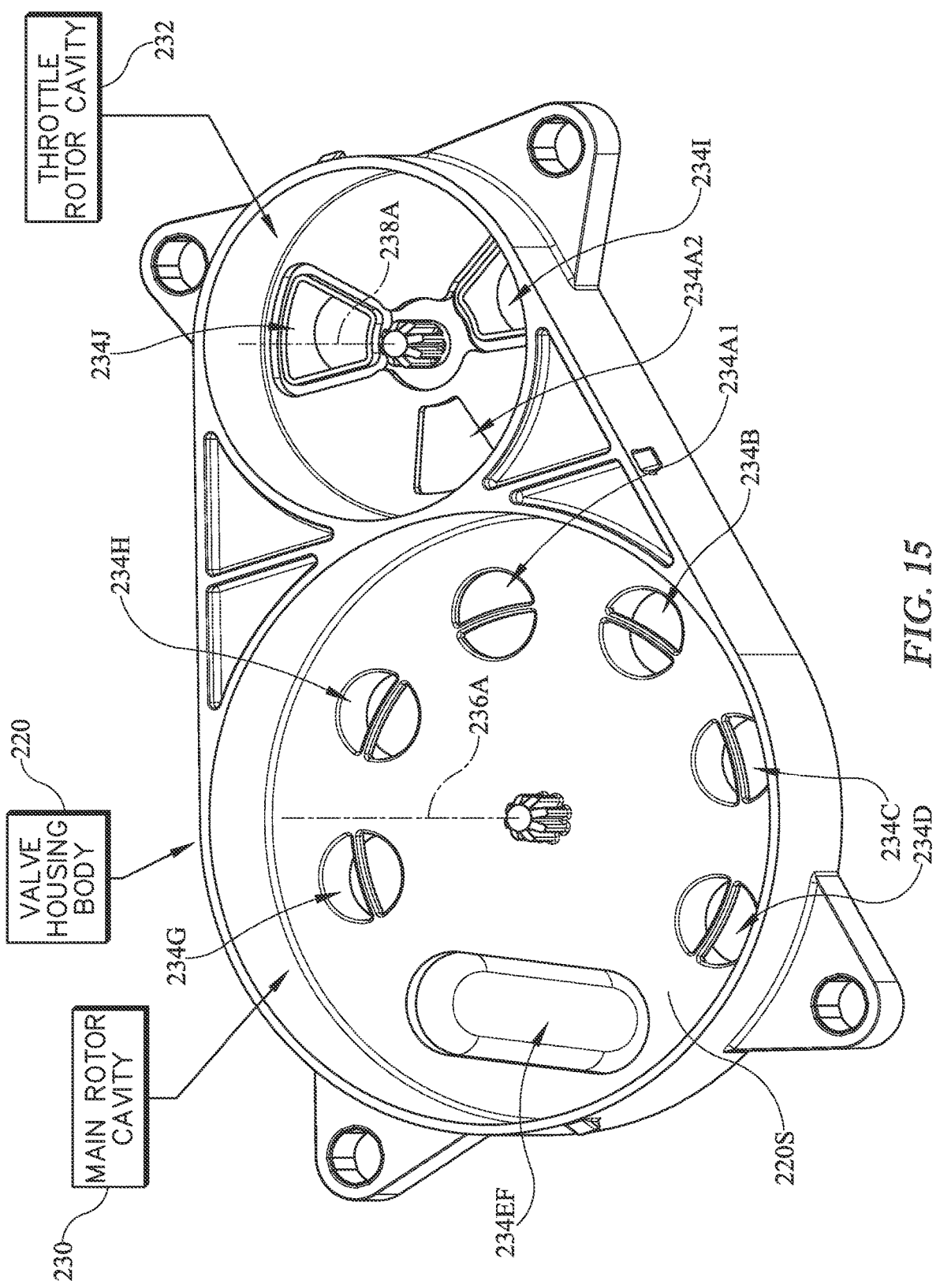

The valve housing body 220 is formed to include a plurality of housing apertures 234A1, 234A2, 234B, 234C, 234D, 234G, 234H, 234I, 234J as shown in FIG. 15. The plurality of housing apertures 234A1, 234A2, 234B, 234C, 234D, 234G, 234H, 234I, 234J are in fluid communication with different thermal fluid circuits. The plurality of housing apertures 234A1, 234A2, 234B, 234C, 234D, 234G, 234H, 234I, 234J are in fluid communication with at least one of the first valve cavity 230 and the second valve cavity 232 of the valve housing body 220. In the illustrative embodiment, the apertures 234A1, 234A2 are in fluid communication with both the first and second valve cavities 230, 232 through the connecting passageway 234A defined by the valve housing 212.

In the illustrative embodiment, the valve housing body 220 is formed to define a channel 234EF instead of two separate apertures 34D, 34E as shown in FIG. 15. The channel 234EF, like the channel 34EF', interconnects more than just adjacent rotor through holes 246A-H when the main valve rotor 236 is in the different predetermined positions. The valve housing body 220 defines the channel 234EF so that when the main valve rotor 236 is in one of the plurality of predetermined positions the valve housing body 220 couples adjacent openings or chambers in fluid communication with each other as suggested in FIGS. 16A-J.

The valve housing body 220 is shaped to define the first valve cavity 230 and the second valve cavity 232 as shown in FIGS. 10-12 and 14. The second valve cavity 232 is in fluid communication with the first valve cavity 230 through the connecting passageway 234A defined between the valve housing body 220 and the lower valve housing cover 224.

The valve flow controller 214 includes the main valve rotor 236 and the throttle valve rotor 238 as shown in FIGS. 10-13. The main valve rotor 236 is arranged in the first valve cavity 230 of the valve housing body 220 and the throttle valve rotor 238 is arranged in the second valve cavity 232 of the valve housing body 220. The main valve rotor 236 is configured to rotate relative to the valve housing body 220 about the first rotor axis 236A and the throttle valve rotor 238 is configured to rotate relative to the valve housing body 20 about the second rotor axis 238A.

The first and second valve rotors 236, 238 cooperate to define a plurality of flow paths through the valve housing body 220. As the first and second valve rotors 236, 238 are rotated about the respective rotor axes 236A, 238A to different set positions, the first and second valve rotors 236, 238 form different flow paths to control the flow of fluid through the housing passageways a of the valve housing body 220.

The main valve rotor 236 includes a main valve rotor body 240, a main valve rotor shaft 242, and a main valve rotor cover 244 as shown in FIGS. 13 and 14. The main valve rotor body 240 extends circumferentially about the first rotor axis 236A. The main valve rotor shaft 242 extends axially away from the main valve rotor body 240 along the first rotor axis 236A and couples to the actuator 226. The main valve rotor cover 244 is coupled to the main valve rotor body 240 for rotation therewith.

The main valve rotor body 240 is shaped to include the plurality of main rotor through holes 246A-H and the main valve rotor cover 244 is shaped to define a plurality of chambers 248A-C and a plurality of cover through holes 250A, 250B. The cover chambers 248A-C each extend around adjacent through holes included in the plurality of main rotor through holes 246A-H in the main valve rotor body 240 when the main valve rotor cover 244 is coupled to the main valve rotor body 240 so as to interconnect the adjacent through holes included in the plurality of main rotor through holes 246A-H in fluid communication with each other.

The main valve rotor cover 244 couples to the main valve rotor body 240 to trap the first seal member 278 axially therebetween as shown in FIGS. 11, 13, and 14. The seal ribs 278R extend into the through holes 246A-H, while the seal base 278B is locate axially between the main valve rotor cover 244 and the main valve rotor body 240.

The main valve rotor body 240 includes a main body plate 252, an outer wall 254, and an inner wall 256 as shown in FIGS. 13 and 14. The main body plate 252 extends circumferentially about the first rotor axis 236A and shaped to define the plurality of main rotor through holes 246A-H that extend axially therethrough. The outer wall 54 extends circumferentially around an outer edge of the main body plate 252. The outer wall 54 extends axially from the outer edge of the main body plate 252 in the same direction as the main valve rotor shaft 242. The inner wall 256 extends circumferentially about the first rotor axis 236A and axially away from the main body plate 252 at a location radially inward of the outer wall 254.

The main valve rotor cover 244 includes a cover plate 258 and flow divider shells 260, 261, 262 as shown in FIGS. 11-14. The cover plate 58 extends circumferentially about the first rotor axis 236A. Each of the flow divider shell 260, 261, 262 defines one of the cover chambers 248A-C and is configured to extend around at least two through holes 246A-H in the main body plate 252.

In the illustrative embodiment, each of the outer wall 254 and the inner wall 256 of the main valve rotor body 240 having deflectable lock tabs 264, 266 as shown in FIG. 14. The lock tabs 264, 266 function similarly to the lock tabs 64, 66 in the embodiment of FIGS. 1-9. The number of lock tabs 264, 266 on the outer and inner walls 254, 256 may vary.

The throttle valve rotor 238 includes a throttle valve rotor plate 268, a throttle valve rotor wall 270, and a throttle valve rotor shaft 272 as shown in FIGS. 11 and 13. The throttle valve rotor plate 268 extends circumferentially about the second rotor axis 238A. The throttle valve rotor wall 270 extends circumferentially around an outer edge of the throttle valve rotor plate 268. The throttle valve rotor wall 270 extends axially from the outer edge of the throttle valve rotor plate 268. The throttle valve rotor shaft 272 extends away from the throttle valve rotor plate 268 along the second rotor axis 238A in the same direction as the throttle valve rotor wall 270.

The throttle valve rotor plate 268 is formed to define the plurality of throttle rotor through holes 274A-C. Each of the throttle valve rotor through holes 274A-C extends axially through the throttle valve rotor plate 268 and circumferentially partway about the second rotor axis 238A.

The first sealing system 216, also referred to as the main sealing system 216, includes a first biasing assembly 276 and a first seal member 278 as shown in FIG. 11. The first biasing assembly 276 is configured to selectively apply an axial force on the main valve rotor 236 to urge the main valve rotor 36 toward the plurality of apertures 234A1, 234A2, 234B, 234C, 234D, 234G, 234H formed in the valve housing body 220 so as to force the first seal member 278 toward the valve housing body 220 and into engagement with a bottom surface 220S of the valve housing body 220 when the main valve rotor 236 is in one of the different predetermined positions to improve sealing between the main valve rotor 236 and the valve housing body 220. In the illustrative embodiment, the first biasing assembly 276 includes cam ramps and cam surfaces like the first bias assembly 76 in the embodiment of FIGS. 1-9.

The second sealing system 218, also referred to as the throttle sealing system 218, includes a second biasing assembly 284 and a second seal member 286 as shown in FIGS. 11-13. The second biasing assembly 284 is configured to apply an axial force on the second valve rotor 238 to urge the second valve rotor 238 toward the second seal member 286 and the bottom surface 220S of the valve housing body 220 and into engagement with the second seal member 286.

The second biasing assembly 284 includes a bias member 288, a bias member cover 290, and a flange 289 formed on the upper valve housing cover 22 as shown in FIGS. 11-13. In the illustrative embodiment, the second biasing assembly 284 includes functions similarly to the second biasing assembly 84 in the embodiment of FIGS. 1-9.

The invention claimed is:

1. A multi-way valve comprising a valve housing including a valve housing body and a housing cover, the valve housing body shaped to define a first valve cavity, a second valve cavity in fluid communication with the first valve cavity, and a plurality of apertures in fluid communication with at least one of the first valve cavity and the second valve cavity, and the housing cover coupled to the valve housing body to close openings of the first and second valve cavities, and a valve flow controller including a first valve rotor arranged in the first valve cavity of the valve housing body and configured to rotate relative to the valve housing about a first rotor axis and a second valve rotor arranged in the second valve cavity of the valve housing body and configured to rotate relative to the valve housing about a second rotor axis, the first and second valve rotors cooperate to define a plurality of flow paths when the first and second valve rotors are rotated about the respective rotor axes to a plurality of different predetermined positions to control a flow of fluid through the valve housing, wherein the first valve rotor includes a first valve rotor body that extends circumferentially about the first rotor axis, a first valve rotor shaft that extends axially away from the first valve rotor body along the first rotor axis, and a first valve rotor cover coupled to the first valve rotor body for rotation therewith, wherein the first valve rotor body is formed to include a plurality of first rotor through holes that extend axially through the first valve rotor body relative to the first rotor axis and align with different apertures included in the plurality of apertures when the first valve rotor is in one of the plurality of different predetermined positions to allow the flow of fluid therethrough, and wherein the first valve rotor cover is formed to define at least one chamber that extends around adjacent first rotor through holes in the first valve rotor body when the first valve rotor cover is coupled to the first valve rotor body so as to interconnect the adjacent first rotor through holes in fluid communication with each other.

2. The multi-way valve of claim 1, wherein the first valve rotor body includes a body plate that extends circumferentially about the first rotor axis and defines the plurality of first rotor through holes, an outer wall that extends circumferentially around an outer edge of the body plate and axially away from the body plate in the same direction as the first valve rotor shaft, and an inner wall that extends circumferentially about the first rotor axis and axially away from the body plate at a location radially inward of the outer wall, and wherein the first valve rotor cover is located between the outer wall and the inner wall of the first valve rotor body.

3. The multi-way valve of claim 2, wherein the first valve rotor cover includes a cover plate that extends circumferentially about the first rotor axis and at least one flow divider shell that defines the at least one chamber.

4. The multi-way valve of claim 2, wherein the first valve rotor body further includes a plurality of deflectable lock tabs configured to engage the first valve rotor cover when the first valve rotor cover is in an engaged position on the first valve rotor body to block axial movement of the first valve rotor cover relative to the first valve rotor body once the first valve rotor cover is located in the engaged position.

5. The multi-way valve of claim 4, wherein at least one of the plurality of deflectable lock tabs is located on the inner wall of the first valve rotor body and at least one of the plurality of deflectable lock tabs is located on the outer wall of the first valve rotor body.

6. The multi-way valve of claim 1, wherein the second valve rotor includes a second valve rotor plate that extends circumferentially about the second rotor axis, a second valve rotor wall that extends circumferentially around an outer edge of the second valve rotor plate and axially from the second valve rotor plate, and a second valve rotor shaft extends away from the second valve rotor plate along the second rotor axis in the same direction as the second valve rotor wall, and wherein the second valve rotor plate is formed to include a plurality of second rotor through holes that extend axially through the second valve rotor plate relative to the second rotor axis.

7. The multi-way valve of claim 6, wherein one of the plurality of second rotor through holes included in the plurality of second rotor through holes extends circumferentially at least partway about the second valve axis.

8. The multi-way valve of claim 1, further comprising a first sealing system including a plurality of first seal members coupled to the first valve rotor for rotation therewith and engaged with an axially facing surface of the valve housing body, wherein at least one first seal member included in the plurality of first seal members extends around adjacent first rotor through holes in the first valve rotor body.

9. The multi-way valve of claim 8, wherein the first sealing system further includes a first biasing assembly configured to selectively apply an axial force on the first valve rotor to urge the plurality of first seal members coupled to the first valve rotor toward the valve housing body when the first valve rotor is in one of the plurality of different predetermined positions to improve sealing between the first valve rotor and the valve housing body.

10. The multi-way valve of claim 9, wherein the first biasing assembly includes cam ramps on an axially facing surface of the housing cover of the valve housing and a cam surface on the first valve rotor configured to engage the cam ramps on the housing cover as the first valve rotor rotates about the first rotor axis to the plurality of different predetermined positions.

11. The multi-way valve of claim 9, further comprising a second sealing system including a second seal member arranged axially between the valve housing body and the second valve rotor and a second biasing assembly configured to apply an axial force on the second valve rotor to urge the second valve rotor toward the second seal member, wherein the second biasing assembly includes a bias member arranged around the second valve rotor shaft, a bias member cover arranged over the bias member and coupled to the second valve rotor shaft for rotation therewith, and a flange formed on the housing cover that engages the bias member cover when the housing cover is coupled to the valve housing body to load the second biasing assembly when the second valve rotor is arranged in the second valve cavity.

12. The multi-way valve of claim 1, further comprising a first sealing system including a first seal member coupled to the first valve rotor for rotation therewith and engaged with an axially facing surface of the valve housing body, wherein the first seal member includes a seal base located axially between the first valve rotor body and the first valve rotor cover and extending circumferentially about the first rotor axis and a plurality of seal rings that each extend axially from the seal base through one first rotor through hole of the plurality of first rotor through holes to engage the axially facing surface of the valve housing body, and wherein the first seal member is formed to define a plurality of openings that each extend through the seal base and one of the plurality of seal rings.

13. The multi-way valve of claim 12, wherein the first sealing system further includes a first biasing assembly configured to selectively apply an axial force on the first valve rotor to urge the first seal member toward the valve housing body when the first valve rotor is in one of the plurality of different predetermined positions to improve sealing between the first valve rotor and the valve housing body.

14. The multi-way valve of claim 13, further comprising a second sealing system including a second seal member arranged axially between the valve housing body and the second valve rotor and a second biasing assembly configured to apply an axial force on the second valve rotor to urge the second valve rotor toward the second seal member, wherein the second biasing assembly includes a bias member arranged around the second valve rotor shaft, a bias member cover arranged over the bias member and coupled to the second valve rotor shaft for rotation therewith, and a flange formed on the housing cover that engages the bias member cover when the housing cover is coupled to the valve housing body to load the second biasing assembly when the second valve rotor is arranged in the second valve cavity.

15. A multi-way valve comprising
a valve housing including a valve housing body and a housing cover, the valve housing body shaped to define a first valve cavity, a second valve cavity in fluid communication with the first valve cavity, and a plurality of apertures in fluid communication with at least one of the first valve cavity and the second valve cavity, and the housing cover coupled to the valve housing body to close openings of the first and second valve cavities, and
a valve flow controller including a first valve rotor arranged in the first valve cavity of the valve housing and configured to rotate relative to the valve housing about a first rotor axis and a second valve rotor arranged in the second valve cavity of the valve housing and configured to rotate relative to the valve housing about a second rotor axis, the first and second valve rotors cooperate to define a plurality of flow paths when the first and second valve rotors are rotated about the respective rotor axes to a plurality of different predetermined positions to control a flow of fluid through the valve housing,
wherein the second valve rotor includes a second valve rotor plate that extends circumferentially about the second rotor axis, a second valve rotor wall that extends circumferentially around an outer edge of the second valve rotor plate and axially from the second valve rotor plate, and a second valve rotor shaft extends away from the second valve rotor plate along the second rotor axis in the same direction as the second valve rotor wall, and wherein the second valve rotor plate is formed to include a plurality of second rotor through holes that extend axially through the second valve rotor plate relative to the second rotor axis and at least partially align with different apertures included in the plurality of apertures when the second valve rotor is in one of the plurality of different predetermined positions to allow the flow of fluid therethrough.

16. The multi-way valve of claim 15, wherein one of the plurality of second rotor through holes included in the plurality of second rotor through holes extends circumferentially at least partway about the second valve axis.

17. The multi-way valve of claim 15, wherein further comprising a second sealing system including a second seal member arranged axially between the valve housing body and the second valve rotor and a second biasing assembly configured to apply an axial force on the second valve rotor to urge the second valve rotor toward the second seal member.

18. The multi-way valve of claim 17, wherein the second biasing assembly includes a bias member arranged around the second valve rotor shaft, a bias member cover arranged over the bias member and coupled to the second valve rotor shaft for rotation therewith, and a flange formed on the housing cover that engages the bias member cover when the housing cover is coupled to the valve housing body to load the second biasing assembly when the second valve rotor is arranged in the second valve cavity.

19. The multi-way valve of claim 15, wherein the first valve rotor includes a first valve rotor body that extends circumferentially about the first rotor axis and a first valve rotor cover coupled to the first valve rotor body for rotation therewith, wherein the first valve rotor body is formed to include a plurality of first rotor through holes that extend axially through the first valve rotor body relative to the first rotor axis, and the first valve rotor cover is formed to define at least one chamber that extends around adjacent first rotor through holes in the first valve rotor body when the first valve rotor cover is coupled to the first valve rotor body.

20. The multi-way valve of claim 19, further comprising a first sealing system including a plurality of first seal members coupled to the first valve rotor for rotation therewith and engaged with an axially facing surface of the valve housing body and a first biasing assembly configured to selectively apply an axial force on the first valve rotor to urge the plurality of first seal members coupled to the first valve rotor toward the valve housing body when the first valve rotor is in one of the plurality of different predetermined positions to improve sealing between the first valve rotor and the valve housing body, wherein at least one first seal member included in the plurality of first seal members extends around adjacent first rotor through holes in the first valve rotor.

21. The multi-way valve of claim 19, further comprising a first sealing system including a first seal member coupled to the first valve rotor for rotation therewith and engaged with an axially facing surface of the valve housing body, wherein the first seal member includes a seal base located axially between the first valve rotor body and the first valve rotor cover and extending circumferentially about the first rotor axis and a plurality of seal rings that each extend axially from the seal base through one first rotor through hole of the plurality of first rotor through holes to engage the axially facing surface of the valve housing body, and wherein the first seal member is formed to define a plurality of openings that each extend through the seal base and one of the plurality of seal rings.

22. A multi-way valve comprising a valve housing including a valve housing body and a housing cover, the valve housing body shaped to define a first valve cavity, a second valve cavity in fluid communication with the first valve cavity, and a plurality of apertures in fluid communication with at least one of the first valve cavity and the second valve cavity, and the housing cover coupled to the valve housing body to close openings of the first and second valve cavities, and a valve flow controller including a first valve rotor arranged in the first valve cavity of the valve housing body and configured to rotate relative to the valve housing about a first rotor axis and a second valve rotor arranged in the second valve cavity of the valve housing body and configured to rotate relative to the valve housing about a second rotor axis parallel to the first rotor axis, the first and second valve rotors cooperate to define a plurality of flow paths when the first and second valve rotors are rotated about the respective rotor axes to a plurality of different predetermined positions to control a flow of fluid through the valve housing, wherein the first valve rotor includes a plurality of first rotor through holes that extend axially through the first valve rotor relative to the first rotor axis and the second valve rotor includes a plurality of second rotor through holes that extend axially through the second valve rotor relative to the second rotor axis.

23. The multi-way valve of claim 22, wherein the first valve rotor includes a first valve rotor body that extends circumferentially about the first rotor axis, a first valve rotor shaft that extends axially away from the first valve rotor body along the first rotor axis, and a first valve rotor cover coupled to the first valve rotor body for rotation therewith, wherein the first valve rotor body is formed to include the plurality of first rotor through holes that extend axially through the first valve rotor body relative to the first rotor axis, and wherein the first valve rotor cover is formed to define at least one chamber that extends around adjacent first rotor through holes in the first valve rotor body when the first valve rotor cover is coupled to the first valve rotor body so as to interconnect the adjacent first rotor through holes in fluid communication with each other.

24. The multi-way valve of claim 23, wherein the first valve rotor body includes a body plate that extends circumferentially about the first rotor axis and defines the plurality of first rotor through holes, an outer wall that extends circumferentially around an outer edge of the body plate and axially away from the body plate in the same direction as the first valve rotor shaft, and an inner wall that extends circumferentially about the first rotor axis and axially away from the body plate at a location radially inward of the outer wall, and wherein the first valve rotor cover is located between the outer wall and the inner wall of the first valve rotor body.

25. The multi-way valve of claim 24, wherein the first valve rotor cover includes a cover plate that extends circumferentially about the first rotor axis and at least one flow divider shell that defines the at least one chamber.

26. The multi-way valve of claim 23, wherein the first valve rotor body further includes a plurality of deflectable lock tabs configured to engage the first valve rotor cover when the first valve rotor cover is in an engaged position on the first valve rotor body to block axial movement of the first valve rotor cover relative to the first valve rotor body once the first valve rotor cover is located in the engaged position.

27. The multi-way valve of claim 22, wherein the second valve rotor includes a second valve rotor plate that extends circumferentially about the second rotor axis, a second valve rotor wall that extends circumferentially around an outer edge of the second valve rotor plate and axially from the second valve rotor plate, and a second valve rotor shaft extends away from the second valve rotor plate along the second rotor axis in the same direction as the second valve rotor wall, and wherein the second valve rotor plate is formed to include the plurality of second rotor through holes that extend axially through the second valve rotor plate relative to the second rotor axis.

28. The multi-way valve of claim 27, wherein one of the plurality of second rotor through holes included in the plurality of second rotor through holes extends circumferentially at least partway about the second valve axis.

29. The multi-way valve of claim 22, further comprising a first sealing system including a plurality of first seal members coupled to the first valve rotor for rotation therewith and engaged with an axially facing surface of the valve housing body, wherein at least one first seal member included in the plurality of first seal members extends around adjacent first rotor through holes in the first valve rotor.

30. The multi-way valve of claim 29, wherein the first sealing system further includes a first biasing assembly configured to selectively apply an axial force on the first valve rotor to urge the plurality of first seal members coupled to the first valve rotor toward the valve housing body when the first valve rotor is in one of the plurality of different predetermined positions to improve sealing between the first valve rotor and the valve housing body.

31. The multi-way valve of claim 22, further comprising a first sealing system including a first seal member coupled to the first valve rotor for rotation therewith and engaged with an axially facing surface of the valve housing body, wherein the first seal member includes a seal base extending circumferentially about the first rotor axis and a plurality of seal rings that each extend axially from the seal base through one first rotor through hole of the plurality of first rotor through holes in the first valve rotor to engage the axially facing surface of the valve housing body, and wherein the first seal member is formed to define a plurality of openings that each extend through the seal base and one of the plurality of seal rings.

32. The multi-way valve of claim 31, wherein the first sealing system further includes a first biasing assembly configured to selectively apply an axial force on the first valve rotor to urge the first seal member toward the valve housing body when the first valve rotor is in one of the plurality of different predetermined positions to improve sealing between the first valve rotor and the valve housing body.

33. The multi-way valve of claim 22, further comprising a second sealing system including a second seal member arranged axially between the valve housing body and the second valve rotor and a second biasing assembly configured to apply an axial force on the second valve rotor to urge the second valve rotor toward the second seal member.

34. The multi-way valve of claim 33, wherein the second biasing assembly includes a bias member arranged around the second valve rotor shaft, a bias member cover arranged over the bias member and coupled to the second valve rotor shaft for rotation therewith, and a flange formed on the housing cover that engages the bias member cover when the housing cover is coupled to the valve housing body.

\* \* \* \* \*